US008345762B2

(12) United States Patent
Vieron et al.

(10) Patent No.: US 8,345,762 B2
(45) Date of Patent: *Jan. 1, 2013

(54) METHOD FOR DERIVING CODING INFORMATION FOR HIGH RESOLUTION PICTURES FROM LOW RESOLUTION PICTURES AND CODING AND DECODING DEVICES IMPLEMENTING SAID METHOD

(75) Inventors: Jérôme Vieron, Bedee (FR); Edouard Francois, Bourg des Comptes (FR); Gwenaelle Marquant, La Chapelle Chaussee (FR); Nicolas Burdin, Paris (FR); Patrick Lopez, Livre sur Changeon (FR); Guillaume Boisson, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 1166 days.

This patent is subject to a terminal disclaimer.

(21) Appl. No.: 11/884,558

(22) PCT Filed: Feb. 14, 2006

(86) PCT No.: PCT/EP2006/050913
§ 371 (c)(1),
(2), (4) Date: Apr. 9, 2008

(87) PCT Pub. No.: WO2006/087319
PCT Pub. Date: Aug. 24, 2006

(65) Prior Publication Data
US 2009/0028245 A1 Jan. 29, 2009

(30) Foreign Application Priority Data

| Feb. 18, 2005 | (EP) | 05101224 |
| Feb. 21, 2005 | (FR) | 05 50477 |
| Mar. 29, 2005 | (EP) | 05102465 |
| Apr. 13, 2005 | (EP) | 05290819 |
| Jun. 2, 2005 | (EP) | 05291194 |

(51) Int. Cl.
*H04N 11/04* (2006.01)
*H04N 7/12* (2006.01)
*H04N 11/02* (2006.01)
*H04B 1/66* (2006.01)

(52) U.S. Cl. .......... 375/240.16; 375/240.12; 375/240.23
(58) Field of Classification Search ................ None
See application file for complete search history.

(56) References Cited

U.S. PATENT DOCUMENTS
5,831,678 A 11/1998 Proctor
(Continued)

FOREIGN PATENT DOCUMENTS
EP 0577337 1/1994
(Continued)

OTHER PUBLICATIONS
"Description of core experiments in SVC", SO/IEC JTC1/SC29/WG11/N6898, XP002340411, Hong Kong (Jan. 2005).*
(Continued)

*Primary Examiner* — Faruk Hamza
*Assistant Examiner* — Andrew Oh
(74) *Attorney, Agent, or Firm* — Robert D. Shedd; Jeffrey M. Navon

(57) ABSTRACT

The invention relates to spatially scalable encoding and decoding processes using a method for deriving coding information. More particularly, it relates to a method for deriving coding information for high resolution pictures from the coding information of low resolution pictures. The method mainly comprises the following steps:
  Computing geometrical parameters characterizing the position of said high layer macroblock relatively to the corresponding base layer macroblocks and deriving from these parameters a macroblock class;
  Deriving a partition and possibly sub-partitions for each partition of said high layer macroblock from corresponding base layer macroblocks partition and sub-partitions on the basis of the geometrical parameters and HL MB class; and
  Deriving motion information for said high layer macroblock from motion information of corresponding base layer macroblocks.

15 Claims, 7 Drawing Sheets

U.S. PATENT DOCUMENTS

| | | | |
|---|---|---|---|
| 5,978,509 A | 11/1999 | Nachtergaele et al. | |
| 6,233,283 B1* | 5/2001 | Chiu et al. | 375/240.27 |
| 6,400,768 B1 | 6/2002 | Nagumo et al. | |
| 6,510,177 B1 | 1/2003 | De Bonet et al. | |
| 6,580,832 B1 | 6/2003 | Kim et al. | |
| 6,639,943 B1 | 10/2003 | Radha et al. | |
| 6,690,724 B1 | 2/2004 | Kadono | |
| 6,728,317 B1* | 4/2004 | Demos | 375/240.21 |
| 6,741,748 B1* | 5/2004 | Son et al. | 382/243 |
| 6,957,350 B1* | 10/2005 | Demos | 380/203 |
| 6,980,667 B2* | 12/2005 | Hamanaka | 382/239 |
| 7,477,690 B2 | 1/2009 | Wang et al. | |
| 7,777,812 B2 | 8/2010 | Sun | |
| 2001/0012322 A1* | 8/2001 | Nagaoka et al. | 375/240 |
| 2002/0001411 A1 | 1/2002 | Suzuki et al. | |
| 2002/0009141 A1* | 1/2002 | Yamaguchi et al. | 375/240.11 |
| 2002/0051581 A1* | 5/2002 | Takeuchi et al. | 382/240 |
| 2002/0150158 A1 | 10/2002 | Wu et al. | |
| 2003/0012279 A1* | 1/2003 | Chaddha | 375/240.12 |
| 2003/0169932 A1* | 9/2003 | Li et al. | 382/239 |
| 2004/0202250 A1 | 10/2004 | Kong et al. | |
| 2004/0264791 A1* | 12/2004 | Jiang et al. | 382/239 |
| 2005/0008079 A1 | 1/2005 | Boon et al. | |
| 2005/0030205 A1* | 2/2005 | Konoshima et al. | 341/50 |
| 2005/0129122 A1 | 6/2005 | Booth et al. | |
| 2005/0175101 A1* | 8/2005 | Honda et al. | 375/240.16 |
| 2005/0207492 A1 | 9/2005 | Pao | |
| 2006/0012719 A1* | 1/2006 | Karczewicz et al. | 348/699 |
| 2006/0083308 A1 | 4/2006 | Schwarz et al. | |
| 2006/0126734 A1 | 6/2006 | Wiegand et al. | |
| 2006/0133475 A1* | 6/2006 | Bruls et al. | 375/240.1 |
| 2006/0133510 A1* | 6/2006 | Saxena et al. | 375/240.24 |
| 2006/0140269 A1* | 6/2006 | Bruls | 375/240.08 |
| 2006/0176955 A1 | 8/2006 | Lu et al. | |
| 2006/0221418 A1 | 10/2006 | Lee et al. | |
| 2006/0222070 A1 | 10/2006 | Park et al. | |
| 2007/0230914 A1* | 10/2007 | Garrido et al. | 386/98 |

FOREIGN PATENT DOCUMENTS

| | | |
|---|---|---|
| EP | 0883300 | 12/1998 |
| EP | 1811786 | 7/2007 |
| JP | 2000013790 | 1/2000 |
| JP | 06209468 | 7/2001 |
| WO | WO9728507 | 8/1997 |
| WO | WO0177871 | 10/2001 |
| WO | WO2004080079 | 9/2004 |
| WO | WO2006110013 | 10/2006 |

OTHER PUBLICATIONS

J. Reichel et al.: "Joint Scalable Video Model JSVM-4", Joint Video Team of ISO/IEC MPEG & ITU-T VCEG, Oct. 31, 2005, pp. 1-41 XP002372058.

J. Reichel et al. "Joint Scalable Video Model JSVM-2", Joint Video Team of ISO/IEC MPEG & ITU-T VCEG, Apr. 22, 2005, pp. 1-31 XP002364223.

J. Reichel et al. "Joint Scalable Video Model JSVM 0", Joint Video Team of ISO/IEC MPEG & ITU-T, Jan. 17, 2005, pp. 1-73 XP002345849.

Search Report Dated Jun. 14, 2006.

Francois, et al., "Generic Extended Spatial Scalability", Joint Video Team (JVT) fo ISO/IEC MPEG 7 ITU-T VCEG (ISO/IEC JTC1/SC 29/WG 13th Meeting, Spain Oct. 22, 2004.

Reichel et al., "Joint Scalable Video Model JSVM-1.0 Reference Encoding Algorithm Description" JTC1/SC29/WG11 and ITU-T SG16 06, N6899 Jan. 2005 pp. 1-39.

J. Vieron et al. "CE4: Inter-layer prediction for interlace/progressive SVC" Joint Video Team (JVT) of ISO/IEC MPEG & ITU-T VCEG (ISO/IEC JTC1/SC29/WG11 and ITU-T SG16 Q.6), 19TH Meeting Geneva, Switzerland. Apr. 1-7, 2006, pp. 1-16, XP002410927.

E. Francois et al. "extended spacial scalability with a 3/2 size ratio"ISO/IEC JTC1/WG11 MPEG2005/M11958, Apr. 13, 2005, pp. 1-34, XP002383335, Busan.

S.J. Wee Et All: "Field-to-Frame Transcoding With Spatial and Temporal Downsampling", Image Proc, 1999, ICIP 99. PROC 1999, Int'l Conf on Kobe, Japan Oct. 24, 1999, vol. 4.

US Office Action dated Sep. 13, 2012 for related U.S. Appl. No. 12/087,349.

Reichel et al., "Joint Scalable Video Model JSVM-5", JVT of ISO/ IEC MPEG & ITU-T VCEG (ISO/IEC JTC1/SC29/WG11 and ITU-T SG16 Q.6), 19th Meeting Geneva, Switzerland Apr. 1-7, 2006, JVT-S202, Online Jul. 8, 2006, XP002410928.

International Search Report dated Feb. 2, 2008 for related U.S. Appl. No. 12/309,159 (PCT/EP2007/056640).

* cited by examiner

METHOD FOR DERIVING CODING INFORMATION FOR HIGH RESOLUTION PICTURES FROM LOW RESOLUTION PICTURES AND CODING AND DECODING DEVICES IMPLEMENTING SAID METHOD

This application claims the benefit, under 35 U.S.C. §365 of International Application PCT/EP2006/050913, filed Feb. 14, 2006, which was published in accordance with PCT Article 21(2) on Aug. 24, 2006 in English and which claims the benefit of European patent application No. 05101224.3, filed Feb. 18, 2005; the benefit of French patent application No. 0550477, filed Feb. 21, 2005, the benefit of European patent application No. 05102465.1, filed Mar. 29, 2005, the benefit of European patent application No. 05290819.1, filed Apr. 13, 2005 and the benefit of European patent application No. 05291194.8, filed Jun. 02, 2005.

1. FIELD OF THE INVENTION

The invention relates to spatially scalable encoding and decoding processes that use a method for deriving coding information. More particularly, it relates to a method, also called inter-layer prediction method, for deriving coding information for high resolution pictures from the coding information of low resolution pictures.

2. BACKGROUND OF THE INVENTION

State-of-art scalable hierarchical coding methods allow to encode the information hierarchically in order that it can be decoded at different resolution and/or quality levels. A data stream generated by a scalable coding device is thus divided into several layers, a base layer and one or more enhancement layers, also called high layers. These devices allow to adapt a unique data stream to variable transmission conditions (bandwidth, error rate . . . ) and also to the capacities of reception devices (CPU, characteristics of reproduction device . . . ). A spatially scalable hierarchical encoding method encodes (or decodes) a first part of data called base layer relating to low resolution pictures, and from this base layer encodes (or decodes) at least another data part called enhancement layer relating to high resolution pictures. The coding information relating to enhancement layer are possibly inherited (i.e. derived) from coding information relating to the base layer by a method called inter-layer prediction method. The derived coding information may possibly comprise: a partitioning pattern associated with block of pixels of the high resolution picture (for splitting said block into several sub-blocks), coding modes associated with said blocks, possibly motion vectors and one or more picture reference indices associated with some blocks allowing to reference the picture used to predict said block. A reference picture is an picture of the sequence used to predict another picture of the sequence. Thus, if not explicitly coded in the data stream, the coding information relating to the enhancement layer has to be derived from the coding information relating to low resolution pictures. State-of-art methods for deriving coding information cannot be used for high resolution pictures whose format is not linked to the format of low resolution pictures by a dyadic transform.

3. SUMMARY OF THE INVENTION

The invention relates to a method for deriving coding information for at least one picture part of a high resolution picture from coding information of at least one picture part of a low resolution picture, each picture being divided into non-overlapping macroblocks and the coding information comprising at least partitioning information. According to the invention, at least one macroblock of the low resolution picture part, called base layer macroblock, is associated with each macroblock of the high resolution picture part, called high layer macroblock, so that the associated low resolution macroblock overlays at least partly the high resolution macroblock when the low resolution picture part upsampled by a first predefined ratio in the horizontal direction and a second predefined ratio in the vertical direction is superposed with the high resolution picture part. The method comprises the following steps:
  computing geometrical parameters for each high layer macroblock in the high resolution picture part on the basis of the position of the high layer macroblock relatively to the base layer macroblock(s) associated with the high layer macroblock, called corresponding base layer macroblock(s);
  deriving a macroblock class for each high layer macroblock in the high resolution picture part on the basis of the geometrical parameters; and
  deriving partitioning information for each high layer macroblock in the high resolution picture part from the partitioning information of the corresponding base layer macroblock(s) on the basis of the geometrical parameters and the high layer macroblock class.

Preferentially, a coordinate system is associated with each high resolution picture and four geometrical parameters are computed, for each high layer macroblock divided into non-overlapping blocks, in the high resolution picture coordinate system as follows:
  a first geometrical parameter is the algebraic distance MbBorderX between the high layer macroblock center and the nearest vertical border of corresponding base layer macroblock(s), the distance being defined according to a first direction;
  a second geometrical parameter is the algebraic distance between the high layer macroblock center and the nearest horizontal border of corresponding base layer macroblock(s), the distance being defined according to a second direction;
  a third geometrical parameter is the algebraic distance between the high layer macroblock center and the nearest vertical border of a block of corresponding base layer macroblock(s), the distance being defined according to the first direction; and
  a fourth geometrical parameter is the algebraic distance between the high layer macroblock center and the nearest horizontal border of a block of corresponding base layer macroblock(s), the distance being defined according to the second direction.

Advantageously, coding information further comprises sub-partitioning information and the method further comprises a step for deriving sub-partitioning information for high layer macroblocks in the high resolution picture part from partitioning information and sub-partitioning information if any of the corresponding base layer macroblock(s) on the basis of the geometrical parameters and the high layer macroblock class.

Advantageously, the coding information further comprises motion information and the method further comprises a step for deriving motion information for each high layer macroblock in the high resolution picture part from motion information of the corresponding base layer macroblock(s).

Preferentially, the step for deriving motion information for each high layer macroblock in the high resolution picture part consists in deriving motion information for each partition of the high layer macroblock and for each sub-partition of each the partition if any.

Preferentially, the motion information of one macroblock, one partition or one sub-partition comprises at least one motion vector having a first and a second component and at least one reference index associated with the motion vector selected among a first or a second list of reference indices, the indices identifying reference pictures.

According to an exemplary embodiment, the step for deriving motion information, comprises a step for homogenizing, for each high layer macroblock in the high resolution picture part, motion information between sub-partitions of same partition. This step consists, for each list of reference indices, in:
 identifying, for each partition of the high layer macroblock, the lowest index of the sub-partitions among the reference indices of said list of reference indices;
 associating the lowest reference index with each of the sub-partitions whose current reference index is not equal to the lowest reference index, the current reference index becoming a previous reference index; and
 associating, with each of the sub-partition whose previous reference index is not equal to the lowest index, the motion vector of one of its neighboring sub-partitions whose the previous reference index is equal to the lowest reference index.

Preferentially, the associated motion vector is the motion vector of the first neighboring sub-partition encountered when checking first the horizontal neighboring sub-partition, secondly the vertical neighboring sub-partition and thirdly the diagonal neighboring sub-partition.

Preferentially, the motion vector components of motion vectors of each macroblock, partition, and sub-partition if any are scaled by the following equations:

$$\begin{cases} d_{sx} = (dx * \text{scaled\_base\_width} + \text{base\_width}/2 * \text{sign}[d_x])/\text{base\_width} \\ d_{sy} = (dy * \text{scaled\_base\_height} + \text{base\_height}/2 * \text{sign}[d_y])/\text{base\_height} \end{cases}$$

Where: $d_x$ and $d_y$ represent the coordinates of the derived motion vector;
 $d_{sx}$ and $d_{sy}$ represents the coordinates of the scaled motion vector;
 sign[x] is equal to 1 when x is positive and −1 when x is negative;
 scaled_base_width and scaled_base_height are the width and the height of the high resolution image part respectively;
 base_width and base_height are the width and height of the low resolution image part respectively.

According to an exemplary embodiment, the macroblocks have a size of 16 by 16 pixels, the block is of size 8 by 8 pixels and wherein the first predefined ratio equal the second predefined ratio.

Preferentially, the method is part of a process for coding video signals and/or is part of a process for decoding video signals.

The invention also relates to a device for coding at least a sequence of high resolution pictures and a sequence of low resolution pictures, each picture being divided in macroblocks. This device comprises:
 first coding means for coding the low resolution pictures, the first coding means generating coding information for the low resolution pictures and a base layer data stream;
 inheritance means for deriving coding information for at least one picture part of a high resolution picture from coding information of at least one picture part of a low resolution picture; and
 second coding means for coding the high resolution pictures using the derived coding information, the second coding means generating an enhancement layer data stream.

Moreover, the invention relates to a device for decoding at least a sequence of high resolution pictures and a sequence of low resolution pictures coded with the coding device defined previously, the coded pictures being represented by a data stream. It comprises:
 first decoding means for decoding at least a first part of the data stream in order to generate low resolution pictures and coding information of the low resolution picture;
 inheritance means for deriving coding information for at least one picture part of a high resolution picture from coding information of at least one picture part of a low resolution picture; and
 second decoding means for decoding at least a second part of the data stream using the derived coding information in order to generate high resolution pictures.

According to an important feature of the invention, the coding information comprising at least partitioning information, the inheritance means of the coding and of the decoding devices comprise:
 means for associating at least one macroblock of the low resolution picture part, called base layer macroblock, with each macroblock of the high resolution picture part, called high layer macroblock, so that the associated low resolution macroblock overlays at least partly the high resolution macroblock when the at least one low resolution picture part upsampled by a first predefined ratio in the horizontal direction and a second predefined ratio in the vertical direction is superposed with the at least one high resolution picture part;
 means for computing geometrical parameters for each high layer macroblock in the at least one high resolution picture part on the basis of the position of the high layer macroblock relatively to the base layer macroblock(s) associated with the high layer macroblock, called corresponding base layer macroblock(s);
 means for deriving a macroblock class for each high layer macroblock in the high resolution picture part on the basis of the geometrical parameters; and
 means for deriving partitioning information for each high layer macroblock in the high resolution picture part from the partitioning information of the corresponding base layer macroblock(s) on the basis of the geometrical parameters and the high layer macroblock class.

Advantageously, the coding device further comprises a module for combining the base layer data stream and the enhancement layer data stream into a single data stream and the first coding means are a MPEG-4 AVC video encoder.

Advantageously, the decoding device further comprises extracting means for extracting the first part of the data stream and the second part of the data stream from the data stream and the first decoding means are a MPEG-4 AVC video decoder.

4. BRIEF DESCRIPTION OF THE DRAWINGS

Other features and advantages of the invention will appear with the following description of some of its embodiments, this description being made in connection with the drawings in which.

5. DETAILED DESCRIPTION OF PREFERRED EMBODIMENTS

Figure 13:
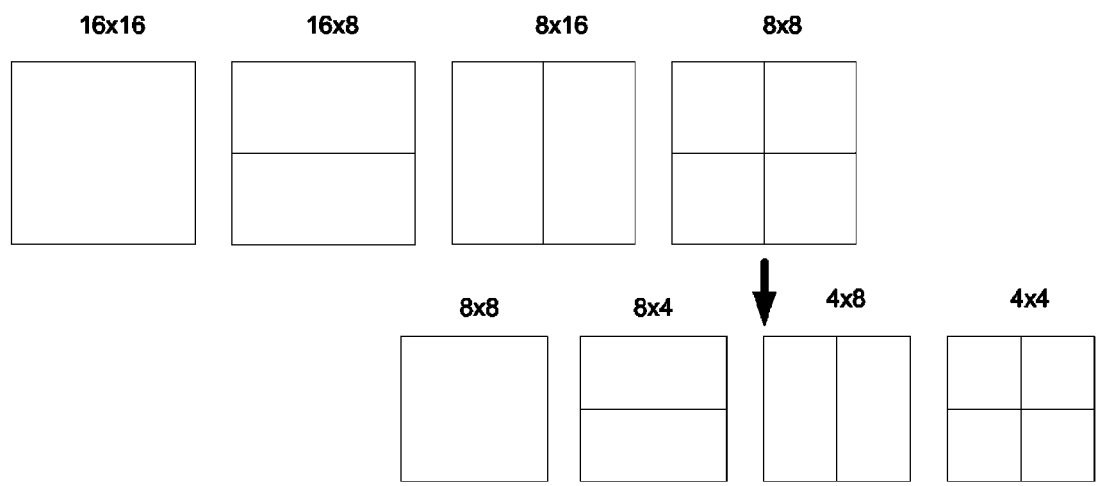
FIG. 13 depicts partitioning and sub-partitioning patterns according to MPEG4 AVC.
Figure 14:
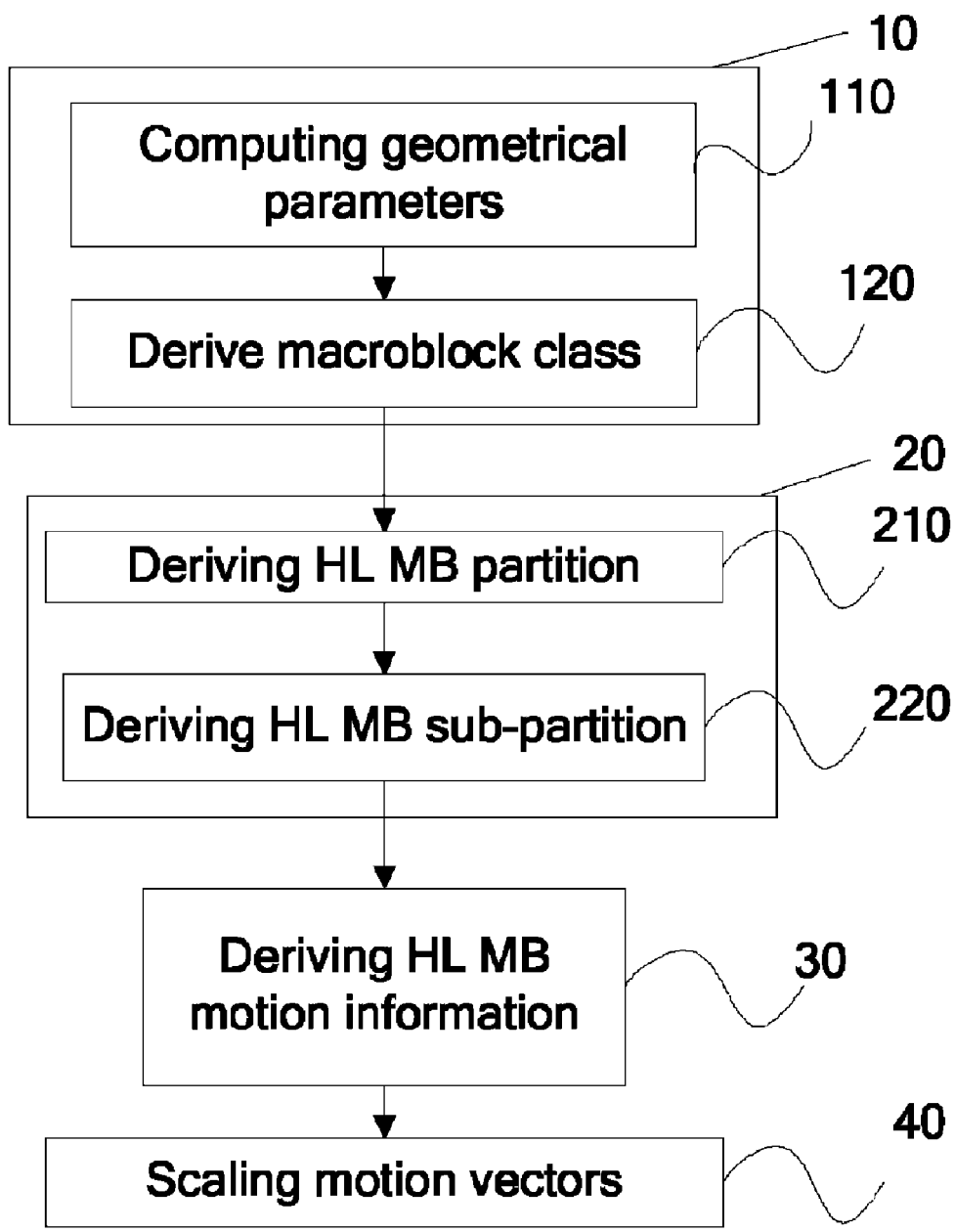
FIG. 14 depicts the flowchart of the method according to the invention.

The invention relates to a method, called inter-layer prediction method, for deriving coding information, of at least a part of a high resolution pictures from coding information of at least a part of a low resolution pictures when the ratio between the high resolution picture part dimensions (i.e. width and height) and the low resolution picture part dimensions (i.e. width and height) are linked with a specific ratio, called inter-layer ratio or upsampling ratio comprised between 1 and 2. Two different inter-layer ratios may be used in the horizontal and in the vertical direction. Each picture is divided in macroblocks. A macroblock position in an picture may be identified either by one of its pixels, e.g. the upper left pixel of said macroblock, or by its coordinates in macroblocks units. For example, the second macroblock of an picture in raster scan order has coordinates (16, 0) in pixel units, i.e. coordinates of its upper left pixel, and has coordinates (1, 0) in macroblock units. A macroblock of a low resolution picture is called low resolution macroblock or base layer macroblock and is denoted BL MB. A macroblock of a high resolution picture is called high resolution macroblock or high layer macroblock and is denoted HL MB. The preferred embodiment describes the invention in the context of spatially scalable coding and decoding and more particularly in the context of spatially scalable coding and decoding in accordance with the standard MPEG4 AVC described in the document ISO/IEC 14496-10 entitled ((Information technology—Coding of audio-visual objects—Part 10: Advanced Video Coding>>. In this case, the low resolution pictures are coded and thus decoded according to the coding/decoding processes described in said document. When coding low resolution pictures coding information is associated with each macroblock in said low resolution picture. This coding information comprises for example information on partitioning and possibly sub-partitioning of the macroblocks, coding mode (e.g. inter coding mode, intra coding mode . . . ), possibly motion vectors and reference indices. A reference index associated with a current block of pixels allows to identify the picture in which the block used to predict current block is located. According to MPE4-AVC, two reference index lists $L_0$ and $L_1$ are used. The FIG. 13 represents the partitioning of a macroblock in blocks according to MPEG4 AVC. On the first line, macroblocks are represented with the different possible macroblock partition as proposed in MPEG4 AVC (e.g. block of size 16 by 8 pixels, called 16×8 block, block 8 by 16 pixels, called block 8×16, and 8 by 8 pixels, called block 8×8). The second line of FIG. 13 represent blocks of size 8 by 8 pixels (8×8 blocks) with the different possible 8×8 block partition, also called sub-partition, as proposed in MPEG4 AVC. Indeed according to MPEG4 AVC when a macroblock is divided into 4 blocks 8×8, each of said blocks may be further divided in 8×4 sub-blocks, in 8×4 sub-blocks, or in 4×4 sub-blocks.

In the sequel, two spatial layers are considered, a low layer (called base layer) corresponding to the pictures of low resolution and a high layer (called enhancement layer) corresponding to the pictures of high resolution. Width and height of enhancement layer pictures (i.e. high resolution pictures) are defined respectively by enh_width and enh_height. Base layer pictures (i.e. low resolution pictures) dimensions are defined by base_width and base_height. Low resolution pictures may be a downsampled version of sub-pictures of enhancement layer pictures, of dimensions scaled_base_width and scaled_base_height, positioned at coordinates (scaled_based_X, scaled_based_Y) in the enhancement layer pictures coordinates system. Low and high resolution pictures may also be provided by different cameras. In this case, the low resolution pictures are not obtained by downsampling high resolution pictures and geometrical parameters may be provided by external means (e.g. by the cameras themselves). The values scaled_based_X and scaled_based_Y are not necessarily aligned on the macroblock structure of the high layer picture. The window corresponding to the scaled base layer is called a cropping window. A low resolution macroblock is associated with a high resolution macroblock, if when superposing the low resolution picture part upsampled by the inter-layer ratio in both directions with the high resolution picture part, the low resolution macroblock overlays at least partly said macroblock of the high resolution picture. The BL MBs associated with a HL MB are called corresponding macroblocks. On borders of the high resolution picture, macroblocks may either have no base layer corresponding macroblock, or be only partially overlayed by scaled base layer macroblocks. Consequently a different managing of the inter layer prediction than in the document from the Joint Video Team (JVT) of ISO/IEC MPEG & ITU-T VCEG JVT-N021 entitled "Joint Scalable Video Model JSVM 1", J. Reichel, H. Schwarz, M. Wien is necessary. This document is referenced as JSVM1 in the sequel.

In the context of spatially scalable coding process such as described in JSVM1, high resolution macroblocks may be coded using classical coding modes (i.e. intra prediction and inter prediction) as those used to encode low resolution pictures. Besides, some specific macroblocks of the high resolution pictures may use a new mode called inter-layer prediction mode. This latter mode is only authorized for high layer macroblocks fully overlayed by scaled based layer, that is, whose coordinates ($Mb_x$, $MB_y$) in macroblock units verify the following conditions:

$MB_x >= $ scaled_base_column_in_mbs and $MB_x < $ scaled_base_column_in_mbs+scaled_base_width/16

And $MB_y >= $ scaled_base_line_in_mbs and $MB_y < $ scaled_base_line_in_mbs+scaled_base_height/16

Where: scaled_base_column_in_mbs=scaled_based_X/16; scaled_base_line_in_mbs=scaled_based_Y/16;
Macroblocks that do not follow these conditions may only use classical modes, i.e. intra prediction and inter-prediction modes, while macroblocks following these conditions may use either intra prediction, inter prediction or inter-layer prediction modes. Such high layer macroblock can exploit inter-layer prediction using scaled base layer motion information, using either "BASE_LAYER_MODE" or "QPEL_REFINEMENT_MODE", as in the case of the macroblock aligned dyadic spatial scalability described in JSVM1. When using "QPEL_REFINEMENT_MODE" mode a quarter-sample motion vector refinement is achieved. Afterward, the encoding process will have to decide for each macroblock fully included in the cropping window, which coding mode to select between intra, inter prediction or and inter-layer. Before deciding which mode to finally select, it is required to derive for each macroblock verifying the above conditions the coding information that will be used to predict this macroblock if inter-layer coding mode if finally selected by the encoding process. Similarly, at the decoder side, if "BASE_LAYER_MODE" or "QPEL_REFINEMENT_MODE" is decoded for a given macroblock, these inter-layer coding information have to be derived first. According to a preferred embodiment, an intermediate structure called prediction macroblock and referenced MBi_pred is used by the encoding process to select afterwards the coding mode of corresponding macroblock $MB_i$.

The bitwise, arithmetic, and relational operators used in the following sections are described in the document ISO/IEC 14496-10 entitled <<Information technology—Coding of audio-visual objects—Part 10: Advanced Video Coding>>. The bitwise operator '>>' is the operator 'shift right with sign extension', the arithmetic operator '%' is the modulus operator, the relational operator '==' means 'equal to', the relational operator '!=' means 'not equal to', and '||' is the logical operator OR.

In the sequel, the following cases are considered:
Generic case: the upsampling ratio and the cropping window are not constrained (the only restriction is that the upsampling ratios also called inter-layer ratios must be between 1 and 2). The vertical and horizontal upsampling ratios may have different values. This configuration corresponds to the ESS_generic solution, also identified as SpatialScalabilityType=3 in the document JSVM2 (Joint Scalable Video Model JSVM-2 Annex S, JVT-O202 from ISO/IEC JTC1/SC29/MWG11 and ITU-T SG16 Q.6).
Ratio 3/2 case: the upsampling ratio (same in both direction) is equal to 3/2 and the cropping window is aligned on macroblock structure. This configuration corresponds to the ESS_3_2 solution, also identified as SpatialScalabilityType=2 in the JSVM2. This is actually a sub-case of the generic case.
scaled_based_X % 16=0 and scaled_based_Y % 16=0
scaled_based_width=3/2*based_width and scaled_based_height=3/2*based_height
Ratio 1 case: the upsampling ratio is equal to 1 and the cropping window is aligned on macroblock structure. This configuration is identified as SpatialScalabilityType=0 in the document JSVM2.
Ratio 2 case: the upsampling ratio is equal to 2 and the cropping window is aligned on macroblock structure. This configuration is identified as SpatialScalabilityType=1 in the document JSVM2.

By convention, a high layer picture coordinate system in pixel units is defined by its origin which is the first pixel of the high layer picture, its horizontal axis oriented from left to right and its vertical axis oriented from top to bottom. A high layer picture coordinate system in MB units is defined by its origin which is the first MB of the high layer picture, its horizontal axis oriented from left to right and its vertical axis oriented from top to bottom. Similarly, a base layer coordinate system in pixel units and a base layer coordinate system in MB units are defined. Other orientations or origins may be used.

For a current high layer macroblock HL MB located at position (MbIdxX, MbIdxY) defined in macroblock units and for which the inter-layer prediction mode is authorized, the inheritance motion information process comprises the following steps:
Computing 110 geometrical parameters characterizing the position of said high layer macroblock relatively to the corresponding base layer macroblocks and deriving 120 from these parameters a macroblock class, called MB class, for said MB HL;
Deriving 20 a partition (for instance 16×16, 16×8 . . . ) and possibly sub-partitions (for instance 8×8, 8×4 . . . ) for each partition of said HL MB from corresponding base layer macroblocks partition and sub-partitions on the basis of the geometrical parameters and HL MB class; and
Deriving 30 motion information (e.g. motion vectors and reference indices) for said HL MB, i.e. for each partition/sub-partition of the HL MB, from motion information of corresponding base layer macroblocks.
The method is described for one HL MB and can be apply to all HL MBs for which the inter-layer prediction mode is authorized.

Figure 1:
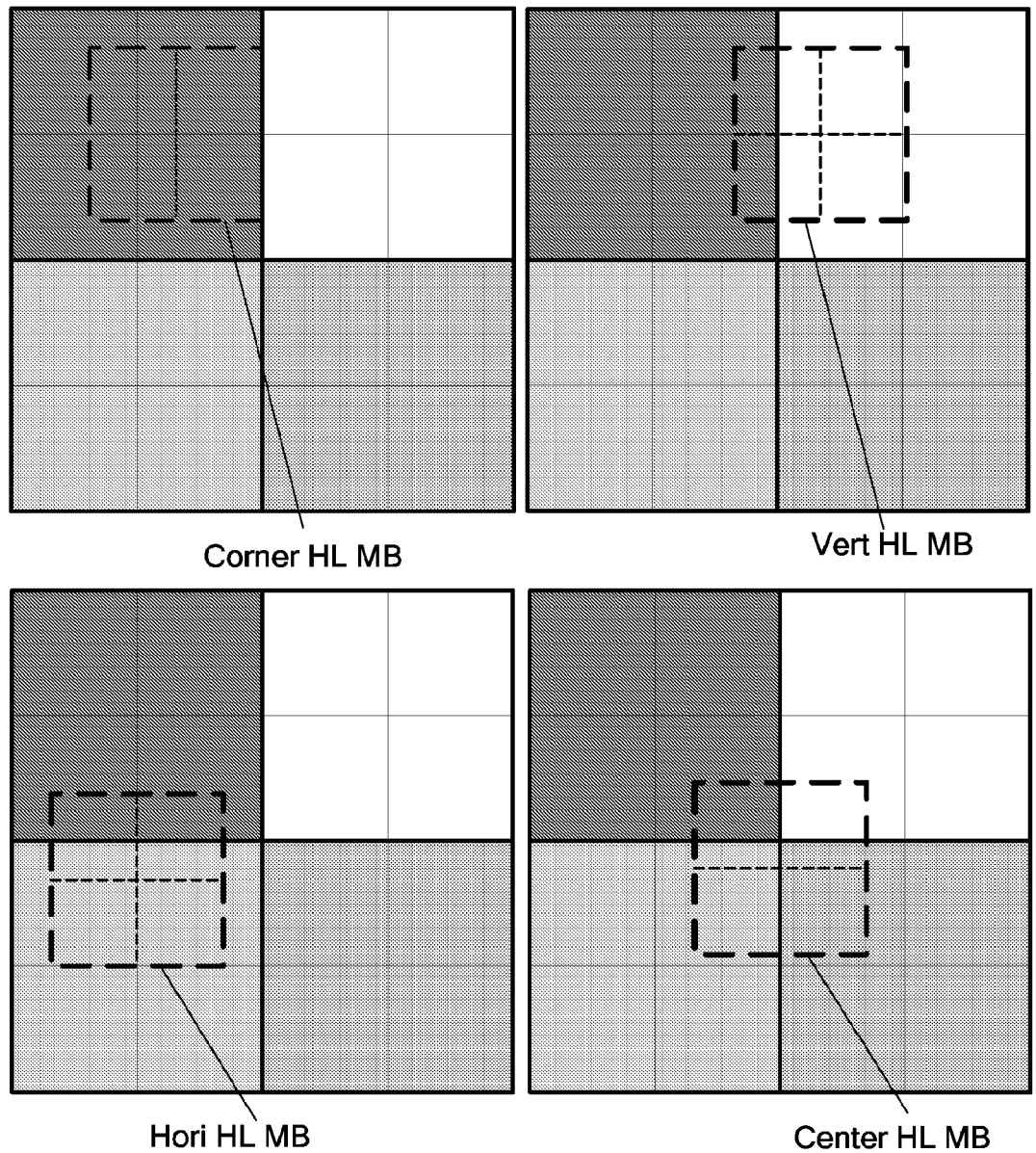
FIG. 1 depicts the position of a high layer macroblock (HL MB) with respect to its base layer corresponding macroblocks (BL MBs) and identify its MB class.
Figure 2:
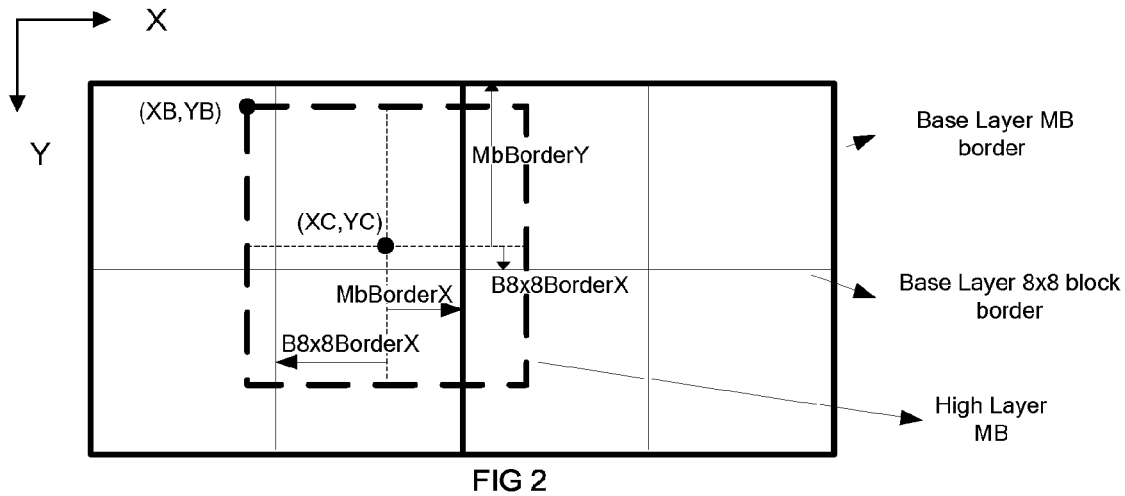
FIG. 2 depicts a HL MB and its corresponding BL MBs.

The step 10 consists in computing 110 geometrical parameters in order to derive 120 a macroblock class for current HL MB among four classes defined according to FIG. 1. On this figure, the HL MB is identified by dotted lines while four scaled BL macroblocks, i.e. upsampled by the inter-layer ratios in both directions, are filled by different grey colors. In reference to FIG. 1, a MB HL whose class is Corner has a single corresponding BL MB, a HL MB whose class is Vert has two corresponding BL MBs, a left and a right MB, a HL MB whose class is Hori has two corresponding BL MBs, a up and a down MB and a HL MB whose class is Center has four corresponding BL MBs. A HL MB whose class is Hori is divided horizontally and a HL MB whose class is Vert is divided vertically by the borders of their corresponding BL MBs as depicted on FIG. 1. A HL MB whose class is Center is divided vertically and horizontally while a Corner MB is not divided by any borders of its corresponding BL MB.
The following geometrical parameters are computed 110 in the high layer picture coordinate system in pixel units as depicted on FIG. 2:

the horizontal algebraic distance MbBorderX between the high layer MB center and the nearest vertical base layer MB border, said distance being defined according to a first direction, i.e. the line going through the high layer MB center and perpendicular to the nearest base layer vertical MB border is oriented, for example, as the horizontal axis of the high layer picture coordinate system;

the vertical algebraic distance MbBorderY between the high layer MB center and the nearest horizontal base layer MB border, said distance being defined according to a second direction, i.e. the line going through the high layer MB center and perpendicular to the nearest base layer horizontal MB border is oriented, for example, as the vertical axis of the high layer picture coordinate system;

the horizontal algebraic distance B8×8BorderX between the high layer MB center and the nearest vertical base layer 8×8 block border, said distance being defined according to the first direction; and the horizontal algebraic distance B8×8BorderX between the high layer MB center and the nearest horizontal base layer 8×8 block border, said distance being defined according to the second direction.

Figure 3:
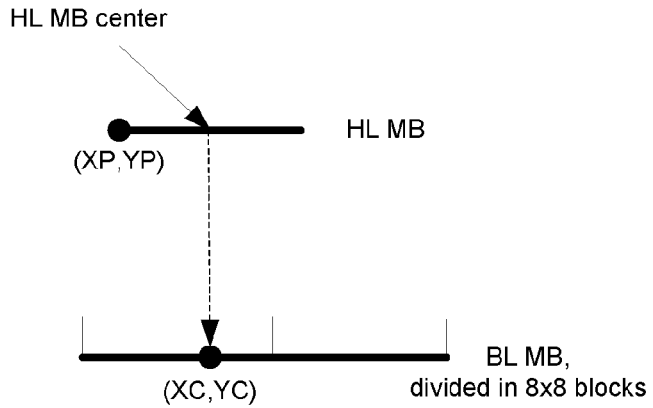
FIG. 3 depicts center position (XC, YC) of a MB HL in the base layer coordinate system.

The geometrical parameters computation 110 requires first the computation of the HL MB center position (XC, YC) in the base layer coordinate system as depicted on FIG. 3 in one dimension. Let (XP, YP) be the position of the upper left sample (i.e. pixel) of the HL macroblock in the high layer coordinate system. The corresponding position (XB, YB) in the base layer coordinate system is computed as follows:

$$XB=(XP0*base\_width+base\_width/2)/scaled\_base\_width$$

$$YB=(YP0*base\_height+base\_height/2)/scaled\_base\_height \quad (eq.\ 1)$$

with (XP0, YP0) being defined as follows:

$$XP0=XP-scaled\_base\_X$$

$$YP0=YP-scaled\_base\_Y \quad (eq.2)$$

In addition, (XC, YC) is defined as the position of the high layer MB center in the base layer coordinate system and is computed as follows:

$$XC=((XP0+8)*base\_width+base\_width/2)/scaled\_base\_width$$

$$YC=((YP0+8)*base\_height+base\_height/2)/scaled\_base\_height \quad (eq.3)$$

Figure 4:
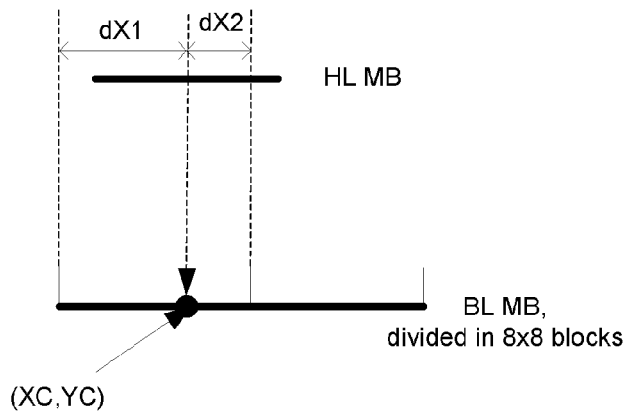
FIG. 4 depicts position dX1 of the left border of an 8×8 base layer block relatively to the center position (XC, YC) of a MB HL resealed in the high layer coordinate system and position dX2 of the right border of an 8×8 base layer block relatively to the center position (XC, YC) of a MB HL rescaled in the high layer coordinate system.

According to a first embodiment, the geometrical parameters are computed 110, in the generic case, from (XC, YC) as described in the following. Let b be the 8×8 BL block containing the point of coordinates (XC, YC). In reference to FIG. 4, the algebraic distances dX1 and dY1 between the point of coordinates (XC, YC) and the left border and up border of b respectively, rescaled in the HL coordinate system, are computed. In the same way, the algebraic distances dX2 and dY2 between the point of coordinates (XC, YC) and the right border and down border of b respectively, rescaled in the HL coordinate system, are computed. Explicit equations are given below:

$$dX1=(8*(XC>>3)*scaled\_base\_width+base\_width/2)/base\_width-(XP0+8) \quad (eq.4a)$$

$$dX2=(8*(XC>>3+1)*scaled\_base\_width+base\_width/2)/base\_width-(XP0+8) \quad (eq.4b)$$

$$dY1=(8*(YC>>3)*scaled\_base\_height+base\_height/2)/base\_height-(YP0+8) \quad (eq.5a)$$

$$dY2=(8*(YC>>3+1)*scaled\_base\_height+base\_height/2)/base\_height-(YP0+8) \quad (eq.5b)$$

These parameters are then rounded to the nearest $4^{th}$ value, as follows:

$$dZi=sign(dZi)*(|dZi|/4+((|dZi|\%\ 4)>2))*4 \text{ with } i=1,2 \quad (eq.6)$$

where Z is replaced successively by X and Y.

The geometrical parameters MbBorderX and B8×8BorderX are set respectively to dX1 and dX2 if XC is inside a left 8×8 block of the BL MB, or to dX2 and dX1, if XC is inside a right 8×8 block of the BL MB. The same applies for the Y dimension.

If$((8*(ZC>>3))\%\ 16==0)$ $$MbBorderZ=dZ1 \text{ and } B8\times8BorderZ=dZ2 \quad (eq.7a)$$

Otherwise $$MbBorderZ=dZ2 \text{ and } B8\times8BorderZ=dZ1 \quad (eq.7b)$$

This generic case process can also apply with ratios 1, 2 and 3/2.

According to a preferred embodiment, the geometrical parameters are computed 110, in the generic case, as follows:

Let dX1 and dX2 be defined as follows:

dX1=((8*(Xc>>13)XC)*scaled_base_width+base_width/2) base_width dX2=((8*(Xc>>3+1)−XC)*scaled_base_width+base_width/2)/base_width Let dY1 and dY2 be defined as follows:

dY1=((8*(Yc>>3)−YC)*scaled_base_height+base_height/2)/base_height dY2=((8*(Yc>>3+1)−YC)*scaled_base_height+base_height/2)/base_height For Z being replaced by X and Y, the following applies.

If$((8*(ZC>>3))\%\ 16==0)$, the following applies.

mbBorderZ=dZ1 b8×8BorderZ=dZ2

Otherwise, the following applies.

mbBorderZ=dZ2 b8×8BorderZ=dZ1

The BL MB coordinates, also called macroblock address, (mbAddrBaseX, mbAddrBaseY) of the upper left MB among the corresponding BL MBs of current HL MB are derived as follows:

If$((8*(ZC>>3))\%\ 16==0)$, the following applies:

mbAddrBaseX=XC/16 mbAddrBaseY=YC/16

If mbBorderX is greater than −6 and is lower than or equal to 0 then mbAddrBaseX=mbAddrBaseX−1

If mbBorderY is greater than −6 and is lower than or equal to 0 then mbAddrBaseY=mbAddrBaseY−1

The geometrical parameters are then rounded to the nearest $4^{th}$ value as follows:

mbBorderZ=sign(mbBorderZ)*(|(mbBorderZ|+2)/4)*4; and b8×8BorderZ=sign(b8×8BorderZ)*((|b8×8BorderZ|+2)/4)*4 where Z is replaced successively by X and Y.

The HL MB class is then derived 120 from the computed geometrical parameters as follows:

| If ( ( \| MbBorderX \| >= 8 ) the following applies. | |
|---|---|
| If ( \| MbBorderY \| >= 8 ) ) | MbClass = corner |
| Otherwise | MbClass = horiz |
| Otherwise the following applies: | |
| If ( \| MbBorderY \| >= 8 ) ) | MbClass = vert |
| Otherwise | MbClass = center |

It can be noted that for inter-layer ratios 1, 2 and 3/2, the geometrical parameters are linked by the following relations:
inter-layer ratio 1: (|MbBorderX|+|B8x8BorderX|) and (|MbBorderY|+|B8x8BorderY|) are equal to 8;
inter-layer ratio 2: (|MbBorderX|+|B8x8BorderX|) and (|MbBorderY|+|B8x8BorderY|) are equal to 16; and
inter-layer ratio 3/2: (1 MbBorderX|+|B8x8BorderX|) and (|MbBorderY|+|B8x8BorderY|) are equal to 12.

According to a specific embodiment, if SpatialScalabilityType equal 0, 1, or 2, the geometrical parameters and the MB class can be deduced directly as described below. Thus explicit computations may be avoided.

If SpatialScalabilityType is equal to 0, i.e. if the inter-layer ratio=1 with MB aligned crop (i.e. the cropping window is aligned on the macroblock structure: scaled_base_X %16==0 and scaled_base_Y %16==0), the MbClass is systematically equal to come. Furthermore, in this case, MbBorderX=MbBorderY=−8 and B8x8BorderX=B8x8BorderY=0.

If SpatialScalabilityType=1, i.e. the inter-layer ratio=2 with MB aligned crop, the MbClass is systematically equal to corner. The geometrical parameters are directly derived from macroblock position, as described in Table 1, where (mod X, mod Y) are defined as follows:
modX=(MbIdxX−(scaled_base_X/16))% 2
modY=(MbIdxY−(scaled_base_Y/16))% 2

TABLE 1 derivation of mb class parameters in case of SpatialScalabilityType 1

| modY | modX | 0 | 1 |
|---|---|---|---|
| 0 | MbClass | Corner | Corner |
|  | (MbBorderX, MbBorderY) | (−8, −8) | (8, −8) |
|  | (B8x8BorderX, B8x8BorderY) | (8, 8) | (−8, 8) |
| 1 | MbClass | Corner | Corner |
|  | (MbBorderX, MbBorderY) | (−8, 8) | (8, 8) |
|  | (B8x8BorderX, B8x8BorderY) | (8, −8) | (−8, −8) |

If SpatialScalabilityType=2, i.e. if the inter-layer ratio=3/2 with MB aligned crop, the different parameters are directly derived from macroblock position, as described in Table 2, where (mod X, mod Y) are defined as follows:
modX=(MbIdxX−(scaled_base_X/16))% 3
modY=(MbIdxY−(scaled_base_Y/16))% 3

TABLE 2 derivation of MB class and geometrical parameters in case of SpatialScalabilityType 2.

| modY | modX | 0 | 1 | 2 |
|---|---|---|---|---|
| 0 | MbClass | Corner | Vert | Corner |
|  | (MbBorderX, MbBorderY) | (−8, −8) | (0, −8) | (8, −8) |
|  | (B8x8BorderX, B8x8BorderY) | (4, 4) | (12, 4) | (−4, 4) |
| 1 | MbClass | Hori | center | Hori |
|  | (MbBorderX, MbBorderY) | (−8, 0) | (0, 0) | (8, 0) |
|  | (B8x8BorderX, B8x8BorderY) | (4, 12) | (12, 12) | (−4, 12) |
| 2 | MbClass | Corner | Vert | Corner |
|  | (MbBorderX, MbBorderY) | (−8, 8) | (0, 8) | (8, 8) |
|  | (B8x8BorderX, B8x8BorderY) | (4, −4) | (12, −4) | (−4, −4) |

The step 20 consists, for current HL MB, in:
deriving 210 a partition (for instance 16×16, 16×8 . . . ); and if required (i.e. if partition is 8×8)
deriving 220 sub-partitions (for instance 8×8, 8×4 . . . ).

Figure 5:
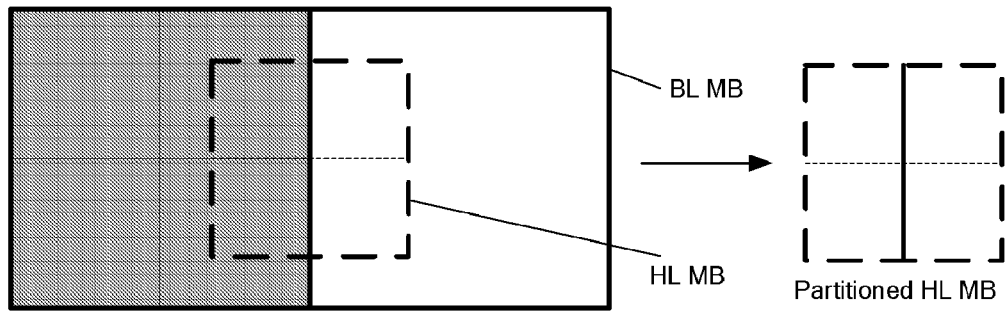
FIG. 5 depicts a HL MB vertically divided into two partitions of size 8 pixels.
Figure 6:
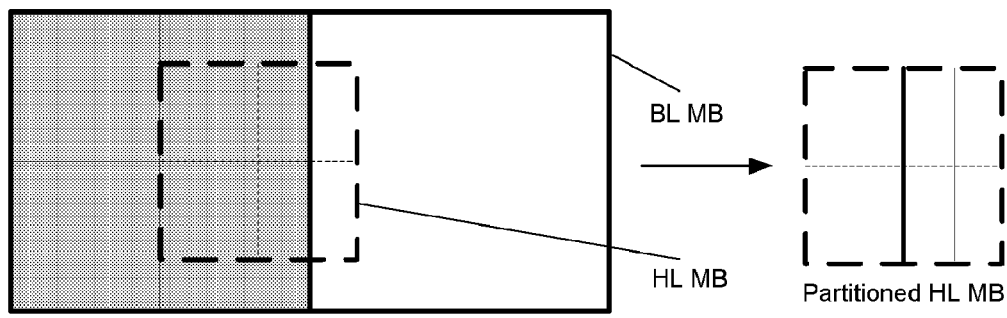
FIG. 6 depicts a HL MB vertically divided into two partitions of size 8 pixels with one of these partitions further vertically divided in two sub-partition of size 4 pixels.
Figure 7:
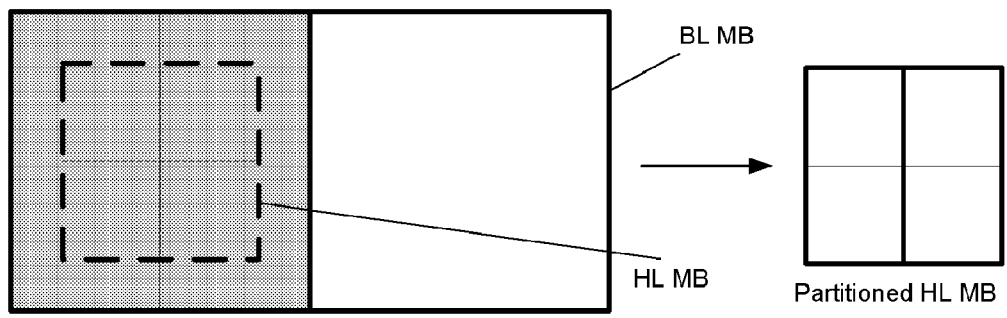
FIG. 7 depicts a HL MB vertically divided into two partitions of size 8 pixels.
Figure 8:
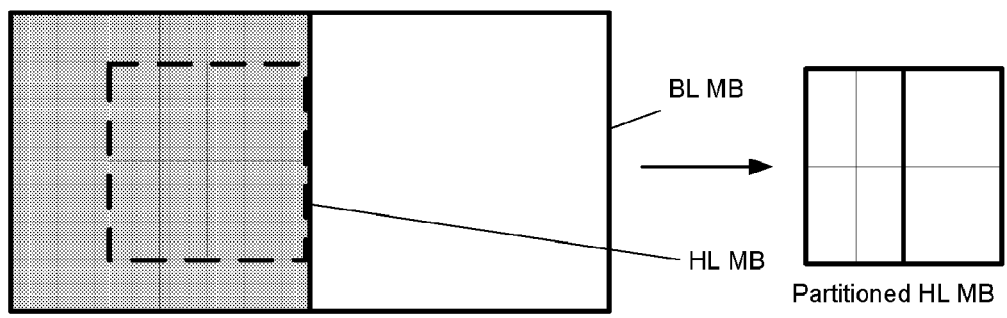
FIG. 8 depicts a HL MB vertically divided into two partitions of size 8 pixels with one of these partitions further vertically divided in two sub-partition of size 4 pixels.
Figure 9:
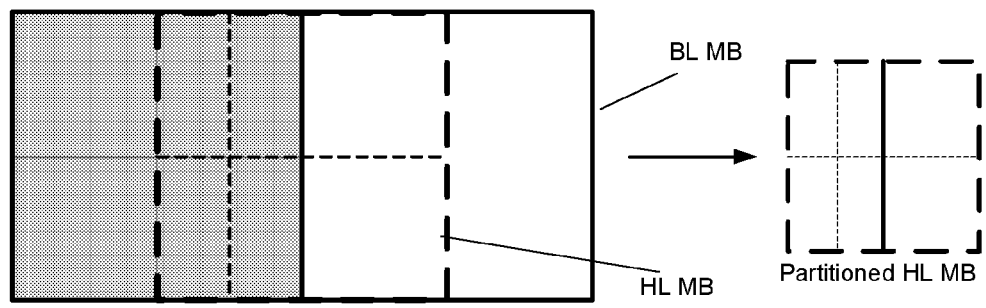
FIG. 9 depicts a HL MB vertically divided by a base layer sub-partition border.
Figure 10:
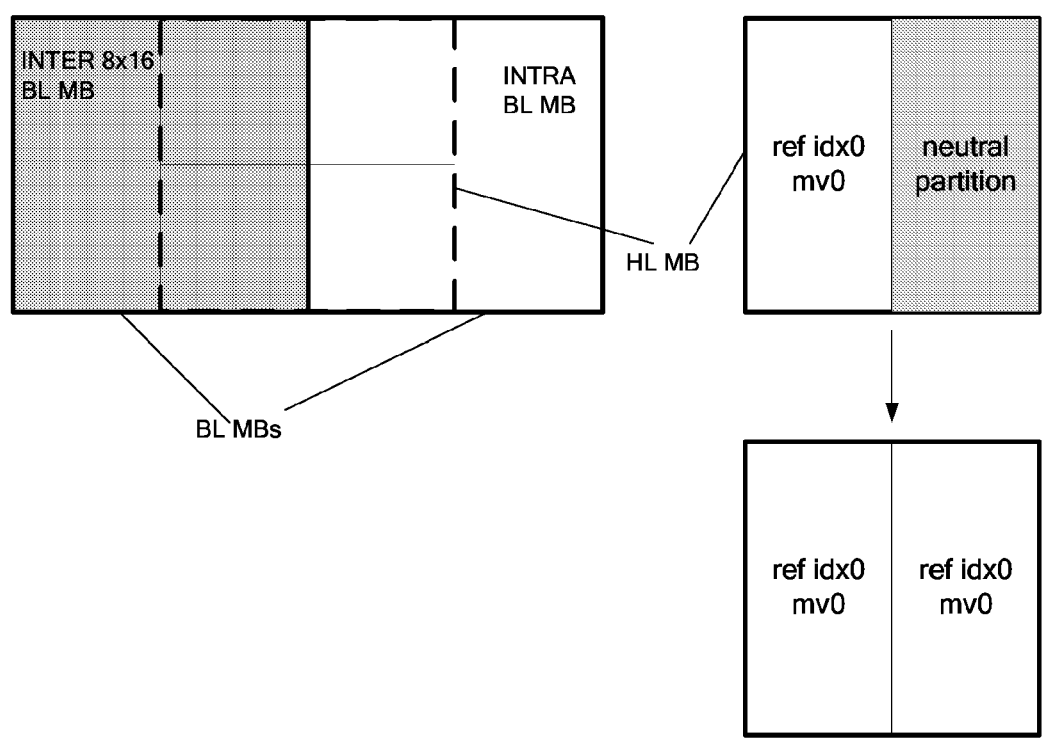
FIG. 10 depicts a neutral partition/sub-partition.

More precisely, the step 20 consists in deriving, for current HL MB, macroblock partition and possibly sub-partitions from the corresponding base layer macroblocks on the basis of the HL MB class, denoted MbClass, and on the basis of its geometrical parameters (MbBorderX, MbBorderY) and (B8x8BorderX, B8x8BorderY). The geometrical parameters are used to identify if the high layer macroblock is potentially divided. Let's consider the process in one dimension, for instance in the horizontal dimension X. The process applies in the same way in both dimensions, MbBorderX and B8x8BorderX being used to identify vertical partitioning/sub-partitioning, MbBorderY and B8x8BorderY being used to identify horizontal partitioning/sub-partitioning.

the HL MB is divided, as follows, if a BL macroblock border is contained in the HL MB:
if |MbBorderX| is equal to 0, the HL MB is vertically divided in 2 partitions of size 8 pixels. This case is illustrated by FIG. 5;
if |MbBorderX| is equal to 4, the HL MB is vertically divided in 2 partitions of size 8 pixels, and moreover one of these partitions is divided in two sub-partitions of size 4 pixels. This case is illustrated by FIG. 6;
the HL MB is divided, as follows, if a BL 8×8 block border, belonging to a BL MB partitioned in two partitions of size 8 pixels, is contained in the HL MB:
if |B8x8BorderX| is equal to 0, the HL MB is vertically divided in 2 partitions of size 8 pixels. This case is illustrated by FIG. 7.
if |B8x8BorderX| is equal to 4, the HL MB is vertically divided in 2 partitions of size 8 pixels, and moreover one of these partitions is divided in two sub-partitions of size 4 pixels. This case is illustrated by FIG. 8.
a HL 8×8 block is divided if a BL sub-partition border, is contained in the HL MB; this corresponds to the following condition:
|MbBorderX+B8x8BorderX|/2=4. This case is illustrated by FIG. 9.

A preferred implementation of the step 20 is described in the annex using the pseudo-code functions.

The sub-step 210 consists in deriving for current HL MB a macroblock partition mode (also called macrocblock partitioning) denoted mbLabel. A mbLabel is derived depending on MbClass, (MbBorderX, MbBorderY) and (B8x8BorderX, B8x8BorderY). On the basis of MbClass, it is possible to compute the corresponding BL MBs coordinates in MB units, as follows:
if MbClass is Corner, there is only N=1 corresponding BL MB positioned at mbAddrBase[0]=(mbAddrBaseX, mbAddrBaseY);

if MbClass is Horiz, there is N=2 corresponding BL MBs positioned at mbAddrBase[0]=(mbAddrBaseX, mbAddrBaseY) and mbAddrBase[1]=(mbAddrBaseX, mbAddrBaseY+1);

if MbClass is Vert, there is N=2 corresponding BL MBs positioned at mbAddrBase[0]=(mbAddrBaseX, mbAddrBaseY) and mbAddrBase[1]=(mbAddrBaseX+1, mbAddrBaseY);

if MbClass is Corner, there is N=4 corresponding BL MBs positioned at mbAddrBase[0]=(mbAddrBaseX, mbAddrBaseY), mbAddrBase[1]=(mbAddrBaseX+1, mbAddrBaseY), mbAddrBase[2]=(mbAddrBaseX, mbAddrBaseY+1) and mbAddrBase[3]=(mbAddrBaseX+1, mbAddrBaseY+1).

Let MbTypeBase[j] be defined as the MB partitioning mode of the corresponding BL MB j a taking its value between 0 and N−1). For instance, if the mode of the corresponding BL MB 1 is B_L0_L0_16×8 (as defined in MPEG4 AVC), then MbTypeBase[1] is equal to 16×8.

MbTypeBase[j] and mbLabel take their value in the set {16×16, 16×8, 8×16, 8×8, INTRA}.

If (|MbBorderX| is equal to 4) or (|MbBorderY| is equal to 4) mbLabel is set to 8×8.

Otherwise,

If MbClass is equal to Center, the following applies:
Let cptrIntra be a counter enabling to identify if the considered macroblock will be classified as INTRA or not. cptrIntra is initially set equal to 0 and is derived as follows:

For each 8×8 block of the current HL MB, indexed by B8×8Idx taking value from 0 to 3 (upper left block index is 0, upper right block index is 1, lower left block index is 2, lower right block index is 3), the following applies:
If(MbTypeBase[B8×8Idx] is equal to INTRA) cptrIntra is incremented by 2;
If the 8×8 block of index B8×8Idx is split by a BL 8×8 block border (left 8×8 blocks, of index 0 and 2, are split if B8×8BorderX is equal to −4; right 8×8 blocks, of index 1 and 3, are split if B8×8BorderX is equal to 4; upper 8×8 blocks, of index 0 and 1, are split if B8×8BorderY is equal to −4; lower 8×8 blocks, of index 2 and 3, are split if B8×8BorderY is equal to 4) then cptrIntra is decremented by 1.

If cptrIntra is greater than or equal to 4, then mbLabel is set to INTRA;

Otherwise, mbLabel is set to 8×8;

Otherwise, three new parameters mbTypeBaseSuffixX, mbTypeBaseSuffixY and is 8×8 Base are derived as follows:
if MbClass is equal to Corner, the following applies:
Let mbTypeBaseSuffixX be the horizontal partitioning mode of BL MB of index j=0 (for instance, if BL MB partitioning mode is 16×8, horizontal partitioning mode is equal to 16; if BL MB partitioning mode is 8×16, horizontal partitioning mode is equal to 8). If BL MB mode is INTRA, then mbTypeBaseSuffixX is set to INTRA;
Let mbTypeBaseSuffixY be the vertical partitioning mode of BL MB of index j=0 (for instance, if BL MB partitioning mode is 16×8, vertical partitioning mode is equal to 8; if BL MB partitioning mode is 8×16, vertical partitioning mode is equal to 16). If BL MB mode is INTRA, then mbTypeBaseSuffixX is set to INTRA;
Let is 8×8 Base be a flag indicating that one of the BL MB partitioning mode is 8×8. If partitioning mode of BL MB of index j=0 is 8×8, is 8×8 Base is set to TRUE, otherwise, it is set to FALSE.

Otherwise, if MbClass is equal to Vert, the following applies:
mbTypeBaseSuffixX is set 8
mbTypeBaseSuffixY is set to the minimum value among the vertical partitioning mode of BL MB of index j=0 and the vertical partitioning mode of BL MB of index j=1. If both BL MBs of index j=0 or j=1 are INTRA, then mbTypeBaseSuffixY is set to INTRA;
If partitioning mode of BL MB of index j=0 or partitioning mode of BL MB of index j=1 is 8×8, is 8×8 Base is set to TRUE, otherwise, it is set to FALSE;

Otherwise, (i.e. MbClass is equal to Hori)
mbTypeBaseSuffixX is set to the minimum value among the horizontal partitioning mode of BL MB of index j=0 and the horizontal partitioning mode of BL MB of index j=1. If both BL MBs of index j=0 or j=1 are INTRA, then mbTypeBaseSuffixX is set to INTRA;
mbTypeBaseSuffixY is set to 8;
If partitioning mode of BL MB of index j=0 or partitioning mode of BL MB of index j=1 is 8×8, is 8×8 Base is set to TRUE, otherwise, it is set to FALSE.

If mbTypeBaseSuffixX is equal to INTRA or mbTypeBaseSuffixY is equal to INTRA, then mbLabel is set to INTRA.

Otherwise, two new parameters mbLabelX and mbLabelY are derived as follows:
mbLabelX is set as the minimum value among 16 and mbTypeBaseSuffixX+|B8×8BorderX|).
mbLabelY is set as the minimum value among 16 and (mbTypeBaseSuffixY+|B8×8BorderY|).
If mbLabelX is equal to 12 or mbLabelY is equal to 12, this means that some 8×8 blocks are divided by a base layer partition border, and consequently mbLabel is set to 8×8.

Otherwise, an additional analysis is performed to check if some 8×8 blocks are divided by a base layer sub-partition border.
If is 8×8 Base is TRUE and mbLabelX is different from 8 and mbLabelY is different from 8, the following applies:
The block index parameter B8×8Idx is derived as follows B8×8Idx=(1-sign(B8×8BorderX))+(1-sign(B8×8BorderY))/2 where sign(x) return−1 if x<0, 1 if x>0, and 0 if x==0.
If |B8×8BorderX| is equal to 8, the following process applies to derive mbLabelX (actually it checks if a vertical base layer sub-partition border divides the 8×8 block of index B8×8Idx):
Let BL4×4B0 be the corresponding BL 4×4 block of the upper left 4×4 block of the considered 8×8 block of index B8×8Idx.
Let subMbTypeBase0 be the sub-partitioning or partitioning type of the sub-partition or partition containing BL4×4B0 (identified using the "4×4 identification" process, with B8×8Idx and 0 as input parameters).
Let BL4×4B1 be the corresponding BL 4×4 block of the lower right 4×4 block of the considered 8×8 block of index B8×8Idx.
Let subMbTypeBase1 be the sub-partitioning or partitioning type of the sub-partition or partition containing BL4×4B1 (identified using the "4×4 identification" process, with B8×8Idx and 3 as input parameters).

mbLabelX is set to the minimum value among the horizontal value of subMbTypeBase0 and subMbTypeBase1 (for instance, if subMbType-Base0 is 4×8, horizontal value is equal to 4). If both are INTRA, then mbLabelX is set to INTRA.

If |B8×8BorderY| is equal to 8, the following process applies to derive mbLabelY (actually it checks if an horizontal base layer sub-partition border divides the 8×8 block of index B8×8Idx):
Let subMbTypeBase0 and subMbTypeBase1 be defined as described above.
mbLabelY is set to the minimum value among the vertical value of subMbTypeBase0 and subMbTypeBase1 (for instance, if subMbType-Base0 is 4×8, vertical value is equal to 8). If both are INTRA, then mbLabelX is set to INTRA.

mbLabel is set to the concatenation of the values of mbLabelX and mbLabelY (for instance if mbLabelX is equal to 8 and mbLabelY is equal to 16, mbLabel is set to 8×16).

The sub-steps 210, 220 and step 30 make use of a common process, called "4×4 identification" process, (equivalent to Function 'getBaseIdx( )' in the annex) in order to identify, for a given 4×4 block of index b4×4Idx of the 8×8 block of index b8×8Idx in current HL MB, the BL macroblock, the BL partition and, if it exists, the BL sub-partition, containing the corresponding BL 4×4 block of the considered HL 4×4 block. The output of this sub-step are the BL macroblock address (BLMBIdxX, BLMBIdxY), the BL partition index BLpartIdx and the BL sub-partition index BLSubPartIdx. For one dimension, let's say X, a direct mapping table is used (cf. table 3), taking as inputs the horizontal index of the high layer 4×4 block (b4×4X, derived as b4×4Idx%4), MbBorderX, B8×8BorderX, and as output the horizontal index of the corresponding BL 4×4 block outB4×4X.

out*B*4×4*X*=MapTab[*b*4×4*X*,MbBorder*X*, *B*8×8Border*X*]

For the Y dimension, outB4×4Y is derived as follows, with b4×4Y=b4×4Idx/4:

out*B*4×4*Y*=MapTab[*b*4×4*Y*,MbBorder*Y*, *B*8×8Border*Y*]

Let mbIdx be defined as the number of the BL MB comprising the BL 4×4 block located at (outB4×4X, outB4×4Y). mbIdx is derived follows:
If MbClass is equal to Corner, mbIdx=0;
Otherwise if (MbClass==Vert), mbIdx=outB4×4X/4;
Otherwise if (MbClass==Hori), mbIdx=outB4×4Y/4;
Otherwise (i.e. MbClass==Center), mbIdx=2*(outB4×4Y/4)+outB4×4X/4. (BLMBIdxX, BLMBIdxY) is set to mbAddrBase[mbIdx].

TABLE 3

Mapping table current and base layer 4 × 4 blocks (MapTab[ ])

| MbBorderZ | B8 × 8BorderZ | b4 × 4 index | | | |
|---|---|---|---|---|---|
| | | 0 | 1 | 2 | 3 |
| −12 | 4 | 0 | 1 | 1 | 2 |
| −8 | 4 | 0 | 0 | 1 | 2 |
| −8 | 8 | 0 | 0 | 1 | 1 |
| −4 | 4 | 3 | 4 | 5 | 6 |
| −4 | 8 | 3 | 4 | 5 | 5 |
| −4 | 12 | 3 | 4 | 4 | 5 |
| 0 | 8 | 2 | 3 | 4 | 5 |
| 0 | 12 | 3 | 3 | 4 | 4 |
| 0 | 16 | 3 | 3 | 4 | 4 |
| 4 | −12 | 2 | 3 | 3 | 4 |
| 4 | −8 | 2 | 2 | 3 | 4 |
| 4 | −4 | 1 | 2 | 3 | 4 |
| 8 | −8 | 2 | 2 | 3 | 3 |
| 8 | −4 | 1 | 2 | 3 | 3 |
| 8 | 0 | 0 | 1 | 2 | 3 |
| 12 | −4 | 1 | 2 | 2 | 3 |
| 12 | 0 | 1 | 1 | 2 | 2 |
| 16 | 0 | 1 | 1 | 2 | 2 |

The sub-step 220 consists in deriving sub-partitioning mode or label for each HL MB partition if required, i.e. if mbLabel is equal to 8×8. For an 8×8 block (i.e. 8×8 partition) with index b8×8Idx, the sub-partitioning mode mbPartLabel is derived as follows:
If a BL MB border vertically splits the 8×8 block, mbPartLabelX is set equal to 4.
Otherwise, if a BL 8×8 block border vertically splits 8×8 block, the following applies.
If the corresponding BL MB of the considered 8×8 block is coded as INTRA, mbPartLabelX is set equal to −1.
Otherwise, mbPartLabelX is derived as follows (actually it checks if a vertical base layer sub-partition border divides the 8×8 block).
Let BL4×4B0 be the corresponding BL 4×4 block of the upper left 4×4 block of the considered 8×8 block of index B8×8Idx.
Let subMbTypeBase0 be the sub-partitioning or partitioning type of the sub-partition or partition containing BL4×4B0 (identified using the "4×4 identification" process with B8×8Idx and 0 as input parameters).
Let BL4×4B1 be the corresponding BL 4×4 block of the lower right 4×4 block of the considered 8×8 block of index B8×8Idx.
Let subMbTypeBase1 be the sub-partitioning or partitioning type of the sub-partition or partition containing BL4×4B1 (identified using the "4×4 identification" process with B8×8Idx and 3 as input parameters).
mbLabelX is set to the minimum value among the horizontal value of subMbTypeBase0 and subMbTypeBase1 (for instance, if subMbTypeBase0 is 4×8, horizontal value is equal to 4). If both are INTRA, then mbLabelX is set to INTRA.
Otherwise, mbPartLabelX is set equal to 8.
Let mbPartLabelY be derived as follows.
If a BL MB border horizontally splits the 8×8 block, mbPartLabelY is set equal to 4.
Otherwise, if a BL 8×8 block border horizontally splits the 8×8 block, the following applies.
If the corresponding BL MB of the considered 8×8 block is coded as INTRA, mbPartLabelY is set equal to −1.
Otherwise, mbPartLabelY is derived as follows (actually it checks if an horizontal base layer sub-partition border divides the 8×8 block).
Let BL4×4B0 be the corresponding BL 4×4 block of the upper left 4×4 block of the considered 8×8 block of index B8×8Idx.

Let subMbTypeBase0 be the sub-partitioning or partitioning type of the sub-partition or partition containing BL4×4B0 (identified using "4×4 identification" process with B8×8Idx and 0 as input parameters).
Let BL4×4B1 be the corresponding BL 4×4 block of the lower right 4×4 block of the considered 8×8 block of index B8×8Idx.
Let subMbTypeBase1 be the sub-partitioning or partitioning type of the sub-partition or partition containing BL4×4B1 (identified using "4×4 identification" process with B8×8Idx and 3 as input parameters).
mbPartLabelY is set to the minimum value among the vertical value of subMbTypeBase0 and sub-MbTypeBase1 (for instance, if subMbType-Base0 is 4×8, vertical value is equal to 8). If both are INTRA, then mbLabelX is set to INTRA.
Otherwise, mbPartLabelY is set equal to 8.
If mbPartLabelX is equal to −1 or mbPartLabelY is equal to −1, mbPartLabel is set equal to INTRA.
Otherwise mbPartLabel is set to the concatenation of the values of mbPartLabelX and mbPartLabelY (for instance if mbPartLabelX is equal to 8 and mbPartLabelY is equal to 4, mbLabel is set to 8×4).

The step 30 consists in deriving motion information for each partition/sub-partition of current HL MB. The motion information is derived as follows:

identify the upper left HL 4×4 block of the considered partition/sub-partition;
identify its corresponding BL 4×4 block, using table 3;
inheriting partition/sub-partition motion information from BL partition/sub-partition comprising the identified BL 4×4 block; if the BL partition/sub-partition is in an INTRA BL MB, the motion information is copied from a neighbouring partition/sub-partition that does not inherit from INTRA BL MBs.

The motion information of partition of index mbPartIdx is thus derived as follows:

Let NotIntraFlag be a parameter initialized to 1.
If mbLabel is not equal to 8×8, the following applies:
  the "4×4 identification" process is invoked to identify the BL macroblock, partition and, if any, sub-partition corresponding to the upper left 4×4 block of the considered partition (of index mbpartIdx).
  If this BL macroblock is in INTRA mode, NotIntraFlag is set equal to 0.
  Otherwise, motion vectors and references indices from the identified BL partition or, if any, sub-partition are copied to the considered partition of index mbPartIdx.
Otherwise, the following applies.
  Let mbPartLabel be the sub-partitioning mode derived using sub-step 220 with mbPartIdx as input.
  If mbPartLabel is equal to INTRA, NotIntraFlag is set equal to 0.
  Otherwise, the following applies.
    For each sub-partition of the considered partition, motion vectors and reference indices are inherited from the corresponding BL partition or, if any, sub-partition. If this BL partition or, if any, sub-partition belongs to an INTRA BL MB, motion vectors and reference indices are copied from one of the neighboring sub-partition (first the horizontal neighbour is examined, then the vertical one, the diagonal one).
    a motion information homogenization sub-step is achieved to enforce each sub-partition of the considered partition to have the same reference index. For each list (0 and 1), the minimum reference index among the sub-partitions is identified. Motion vectors and reference index of sub-partitions with reference index not equal to this minimum reference index are copied from neighboring sub-partitions with reference index equal to this minimum reference index (first the horizontal neighbour is examined, then the vertical one, the diagonal one).

The third step 30 is applied to each partition of the considered HL MB. For partitions with NotIntraFlag equal to 0, sub-partitioning mode, motion vectors and reference indices are copied from a neighboring partition with NotIntraFlag equal to 1 (first the horizontal neighbour is examined, then the vertical one, the diagonal one).

Instead of the minimum reference index, the reference index most commonly used in current partition mbPartIdx may be used by the motion information homogenization sub-step.

The step 40 consists in scaling derived motion vectors. To this aim, a motion vector scaling is applied to derived motion vectors. A motion vector mv=($d_x$, $d_y$) is scaled using the following equations:

$$\begin{cases} d_{sx} = (dx * \text{scaled\_base\_width} + \text{base\_width}/2 * \text{sign}[d_x])/\text{base\_width} \\ d_{sy} = (dy * \text{scaled\_base\_height} + \text{base\_height}/2 * \text{sign}[d_y])/\text{base\_height} \end{cases}$$

where sign[x] is equal to 1 when x is positive and −1 when x is negative.

The method according to the invention thus allows to derive such coding information for at least one macroblock in the high resolution pictures. The high resolution pictures are then possibly coded using these derived coding information. In this case, the number of bits required to encode the high resolution pictures is decreased since no coding information is encoded in the data stream for each macroblock whose coding information is derived from low resolution pictures. Indeed, since the decoding process uses the same method for deriving coding information for the high resolution pictures, there is no need to transmit it.

Figure 11:
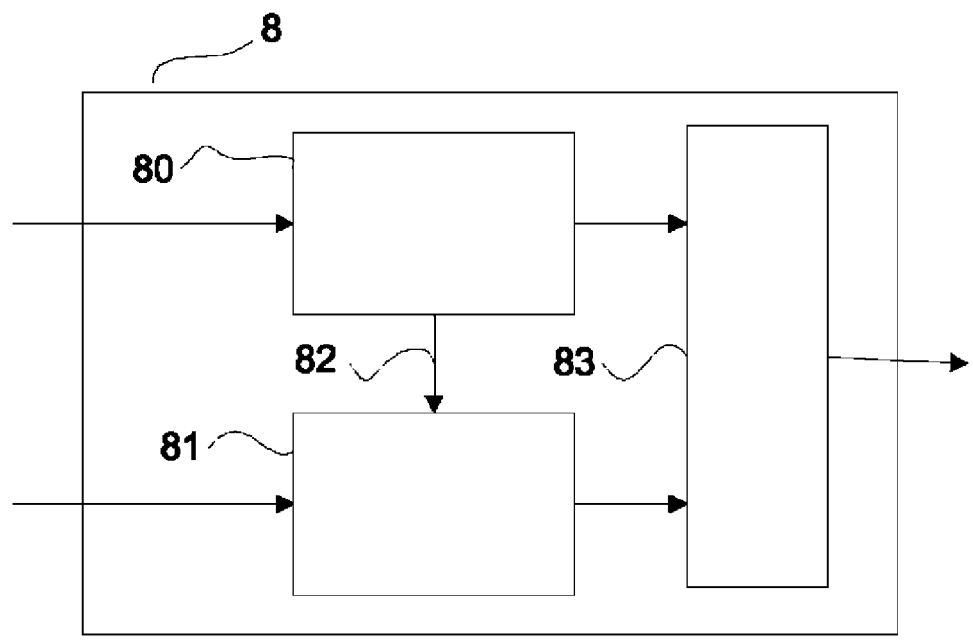
FIG. 11 depicts a encoding device according to the invention.

The invention concerns a coding device 8 depicted on FIG. 11. The coding device 8 comprises a first coding module 80 for coding the low resolution pictures. The module 80 generates a base layer data stream and coding information for said low resolution pictures. Preferentially the module 80 is adapted to generate a base layer data stream compatible with MPEG4 AVC standard. The coding device 8 comprises inheritance means 82 used to derive coding information for high resolution pictures from the coding information of the low resolution pictures generated by the first coding module 80. The inheritance means 82 are adapted to implement the steps 10, 20, and 30 of the method according to the invention. The coding device 8 comprises a second coding module 81 for coding the high resolution pictures. The second coding module 81 uses the coding information derived by the inheritance means 82 in order to encode the high resolution pictures. The second coding module 81 thus generates an enhancement layer data stream. Preferentially, the coding device 8 also comprises a module 83 (for example a multiplexer) that combines the base layer data stream and the enhancement layer data stream provided by the first coding module 80 and the second coding module 81 respectively to generate a single data stream. The coding information related to the high resolution pictures are not coded in the data stream since they are derived from the coding information related to the low resolution pictures that are provided by the module 80. This allows to save some bits.

Figure 12:
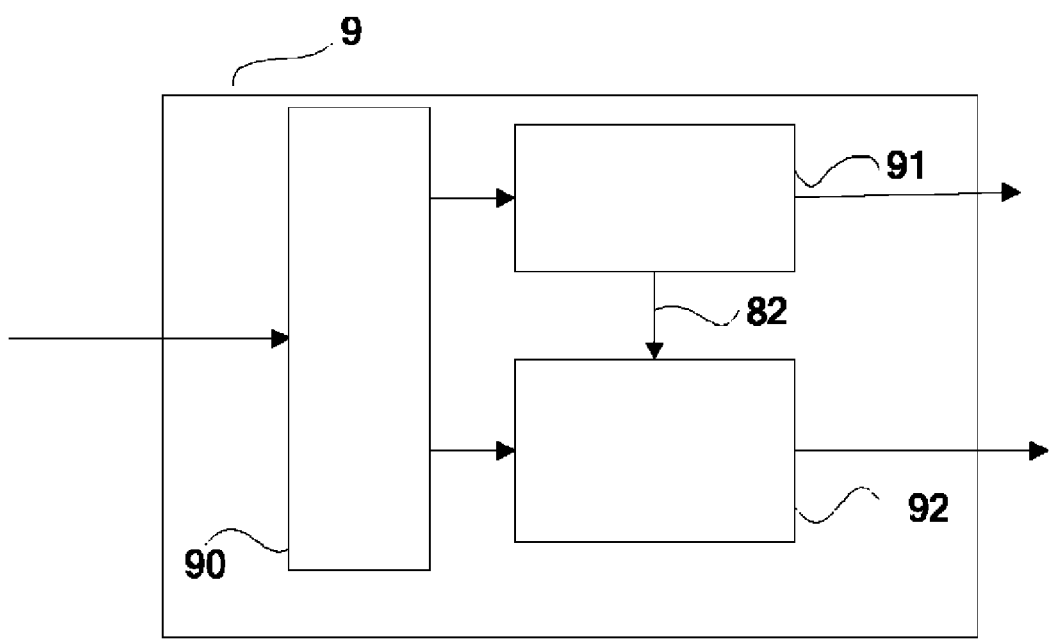
FIG. 12 depicts a decoding device according to the invention.

The invention also concerns a decoding device 9 depicted on FIG. 12. This device 9 receives a data stream generated with the coding device 8. The decoding device 9 comprises a first decoding module 91 for decoding a first part of the data stream, called base layer data stream, in order to generate low resolution pictures and coding information for said low resolution pictures. Preferentially the module 91 is adapted to decode a data stream compatible with MPEG4 AVC standard. The decoding device 9 comprises inheritance means 82 used to derive coding information for high resolution pictures from the coding information of the low resolution pictures generated by the first decoding module 91. The decoding device 9 comprises a second decoding module 92 for decoding a second part of the data stream, called enhancement layer data stream. The second decoding module 92 uses the coding information derived by the inheritance means 82 in order to decode a second part of the data stream. The second decoding module 92 thus generates the high resolution pictures. Advantageously, the device 9 comprises also an extracting module 90 (e.g. a demultiplexer) for extracting from the received data stream the base layer data stream and the enhancement layer data stream.

According to another embodiment the decoding device receives two data stream: a base layer data stream and an enhancement layer data stream. In this case the device 9 does not comprise an extracting module 90.

The invention is not limited to the embodiments described. Particularly, the invention described for two sequences of pictures, i.e. two spatial layers, may be used to encode more than two sequences of pictures.

Annex

The following section describes preferred implementation of derivation step 20, i.e. sub-steps 210 and 220, and step 30 using pseudo-code functions defined hereinafter.

The sub-step 210 consists in deriving, for each HL MB, a partitioning mode mbLabel as follows:
 If (|MbBorderX|==4) or (|MbBorderY|==4) mbLabel=8×8
 Otherwise,
  If (MbClass==Center)
   Let cptrIntra be a variable set equal to 0;
   For B8×8Idx indexed by 0.3
    If(MbTypeBase[B8×8Idx]==INTRA) cptrIntra+=2
    If splitBlock(B8×8BorderX, B8×8Idx, 0) cptrIntra+= −1
    If splitBlock(B8×8BorderY, B8×8Idx, 1) cptrIntra+= −1
   If (cptrIntra>=4) mbLabel=INTRA;
   Otherwise, mbLabel=8×8;
  Otherwise,
   if (MbClass==Corner)
    mbTypeBaseSuffixX=Suffix(MbTypeBase[0], 0)
    mbTypeBaseSuffixY=Suffix(MbTypeBase[0], 1)
    is 8×8 Base=(MbTypeBase[0]==8×8)
   Otherwise, if (MbClass==Vert)
    mbTypeBaseSuffixX=8
    mbTypeBaseSuffixY=minBlockSize (Suffix(MbTypeBase[0] 1), Suffix(MbTypeBase[1], 1))
    is 8×8 Base=(mbTypeBase0==8×8)||(mbTypeBase1==8×8)
   Otherwise, (i.e. if MbClass==Hori)
    mbTypeBaseSuffixX=minBlockSize (Suffix(MbTypeBase[0] 0), Suffix, MbTypeBase[1], 0))
    mbTypeBaseSuffixY=8
    is 8×8 Base=(mbTypeBase0==8×8)||(mbTypeBase1==8×8)
   If(mbTypeBaseSuffixX==INTRA) or (mbTypeBaseSuffixY==INTRA) mbLabel=INTRA
   Otherwise,
    mbLabelX=min(16, mbTypeBaseSuffixX+|B8×8BorderX|)
    mbLabelY=min(16, mbTypeBaseSuffixY+|B8×8BorderY|)
    If (mbLabelX==12) or (mbLabelY==12) mbLabel=INTRA=8×8
    Otherwise,
     If (is 8×8 Base) and (mbLabelX !=8) and (mbLabelY !=8)
      B8×8Idx=(1−sign(B8×8BorderX))+(1−sign(B8×8BorderY))/2
      If(|B8×8BorderX|==8)
      mbLabelX min (mbLabelX, 2* getSubMbtypeBaseDim(B8×8Idx, 0))
      If(B8×8BorderY==8)
      mbLabelY=min (mbTypeY, 2* getSubMbtypeBaseDim(B8×8Idx, 1))
    mbLabel=mbLabelX_mbLabelY The sub-step 220 consists in deriving, if required, sub-partitioning mode mbPartLabel for each HL MB partition as follows:
 Let mbPartLabelX be derived by invoking computeSubMbTypeSize(MbBorderX, B8×8BorderX, b8×8Idx, 0);
 Let mbPartLabelY be derived by invoking computeSubMbTypeSize(MbBorderY, B8×8BorderY, b8×8Idx, 1);
 If (mbPartLabelX==−1) or (mbPartLabelY==−1) mbPartLabel=INTRA;
 Otherwise mbPartLabel=mbPartLabelX_mbPartLabelY.

The step 30 consists in deriving motion information for each HL MB partition of index mbPartIdx. The step takes as inputs:
 a macroblock partition label mbLabel; and
 a macroblock partition index mbPartIdx. and it outputs:
 reference indices RefIdxL0[mbPartIdx] and RefIdxL1[mbPartIdx]; and
 motion vectors MvL0[mbPartIdx][i] and MvL1[mbPartIdx][i] with i=0 . . . nbPart, and nbPart being the number of partitions corresponding to mbLabel.

The step 30 consists in the following
 If inheritPartitionMotion(mbLabel, predIdx) is equal to 0, the following applies:
  Let predIdx be a variable derived by invoking computepredIdx(subMbPartIdx, 1);
  If inheritPartitionMotion(mbLabel, predIdx) is equal to 0, the following applies:
   predIdx is derived by invoking computePredIdx(subMbPartIdx, 2)
   inheritPartitionMotion(mbLabel, predIdx) is invoked;
  RefIdxLX[mbPartIdx]=RefIdxLX[predIdx];
  Let mbPartLabel be derived by applying sub-step 210;
  Let nbSubPart be the number of sub-partitions corresponding to mbPartLabel;
  For subMbPartIdx indexed by 0 . . . nbSubPart−1, the following applies:
   MvLX[mbPartIdx][subMbPartIdx]=MvLX[predIdx][subMbPartIdx].

Suffix (type, dim)
This function gives the suffix of the variable named 'type' corresponding to the dimension dim (dim is equal to 0 for X, i.e. horizontal dimension, and to 1, i.e. vertical dimension, for Y). If the input is INTRA it returns INTRA.
If type is an INTRA mode, returns INTRA
    Otherwise, the following applies
        The last part of the name of type is first extracted (for instance, 16×8)
            If (dim==0) the first dimension value is returned (16 in the previous example)
            Otherwise, the second dimension value is returned (8 in the previous example)
splitBlock (borderPos, b8×8Idx, dim)
This function returns 1 if the 8×8 block b8×8Idx is potentially divided in the dimension dim, i.e. in the horizontal or vertical dimension.
    If(|D|==4)
        If(dim) return–(2*(b8×8Idx/2)–1))==sign (borderPos)
        Otherwise return–(2*(b8×8Idx % 2)–1))==sign border-Pos)
    Otherwise, return 0.
minBlockSize(size0, size1)
This function returns the min between size0 and size1. If both inputs are INTRA, it returns INTRA.
    If(size==INTRA)
        If(size1==INTRA) return INTRA
        Otherwise, return size1
    Otherwise, if (size1==INTRA), return size0
        Otherwise, return min(size0, size1)
getMbtypeBaseDim (B8×8Idx, dim)
This function returns the mb_Type Suffix, corresponding to dimension dim, of the base macroblock(s) from which the 8×8 block B8×8Idx inherites.
    If(MbClass==Corner)
        return Suffix(MbTypeBase[0], dim)
    Otherwise, if(MbClass==Verti)
        if splitBlock(MbBorderX, B8×8Idx, 0)
            return minBlockSize(Suffix(MbTypeBase[0], dim), Suffix(MbTypeBase[1], dim))
        Otherwise,
            mbIdx=B8×8Idx % 2
            return Suffix(MbTypeBase[mbIdx], dim)
    Otherwise, if(MbClass==Hori)
        if splitBlock(MbBorderY, B8×8Idx, 1)
            return minBlockSize(Suffix(MbTypeBase[0], dim), Suffix(MbTypeBase[1], dim))
        Otherwise,
            mbIdx=b8×8Idx/2
            return Suffix(MbTypeBase[mbIdx], dim)
    Otherwise, if(MbClass==Center)
        If splitBlock(MbBorderX, B8×8Idx, 0)
            return minBlockSize(Suffix(MbTypeBase[0], dim), Suffix(MbTypeBase[1], dim))
        Otherwise,
            if splitBlock(MbBorderY, B8×8Idx, 1)
                return minBlockSize(Suffix(MbTypeBase[0], dim), Suffix(MbTypeBase[1], dim))
            Otherwise, return Suffix(MbTypeBase[b8×8Idx], dim)
getSubMbtypeBaseDim (B8×8Idx, dim)
This function returns the submb_Type Suffix, corresponding to dimension dim, of the base 8×8 block(s) from which the 8×8 block B8×8Idx inherits.
    Let subMbTypeBase0 and subMbTypeBase1 be defined as follows.
        Let mbAddrBase0, mbPartIdx0, subMbPartIdx0 be derived by invoking function getBaseIdx(B8×8Idx, 0)
        Let mbAddrBase1, mbPartIdx1, subMbPartIdx1 be derived by invoking function getBaseIdx(B8×8Idx, 3)
        Let subMbTypeBase0 be the sub-MB type of partition mbPartIdx00f mbAddrBase0
        Let subMbTypeBase1 be the sub-MB type of partition mbPartIdx10f mbAddrBase1
    return minBlockSize(Suffix(subMbTypeBase0, dim), Suffix(subMbTypeBase1, dim)).
getBaseIdx (B8×8Idx, b4×4Idx)
This function returns (mbAddrBase, mbPartIdxBase, subMbPartIdxBase) being the base macroblock address, the base partition index and, if it exists, the base sub partition index respectively, from which the 4×4 block B8×8Idx/b4×4Idx inherits.
    Let idxBaseBX and idxBaseBY be defined as follows.
        Let MapTab be Table 3 which gives the mapping between current and base layer 4×4 blocks as a function of MbBorderZ and B8×8BorderZ (with Z equal to X or Y).
        idxBaseBX=MapTab[MbBorderX, B8×8BorderX, 2*(B8×8Idx % 2)+(b4×4Idx % 2)]
        idxBaseBY=MapTab[MbBorderY, B8×8BorderY, 2*(B8×8Idx/2)+(b4×4Idx/2)]
    Let mbIdx be defined as follows.
        If (MbClass==Corner), the following applies:
            mbIdx=0
    Otherwise if (MbClass==Vert, the following applies:
        mbIdx=idxBaseBX/2
        Otherwise if (MbClass==Hori) the following applies:
            mbIdx=idxBaseBY/2
        Otherwise (MbClass==Center), the following applies:
            mbIdx=2*(idxBaseBY/2)+idxBaseBX/2
    mbAddrBase is set to aMbAddrBase[mbIdx]
    B8×8IdxBase is set to(2*((dxBaseBY/2) % 2)+((idxBaseBX 2) % 2))
    b4×4IdxBase is set to (2*(idxBaseBY % 2)+(idxBaseBX % 2))
    Let mbPartIdxBase be defined as the index of the macroblock partition of mbAddrBase comprising the 4×4 block b4×4IdxBase
    Let subMbPartIdxBase be defined as the index of the sub-partition, if it exists, of partition mbPartIdxBase, comprising the 4×4 block B8×8IdxBase/b4×4IdxBase.
    return (mbAddrBase, mbPartIdxBase, subMbPartIdxBase)
computeSubMbTypeSize(D, d, B8×8Idx, dim)
    If splitBlock(D, B8×8Idx, dim)==1, the function returns 4
    Otherwise, if splitBlock(d, B8×8Idx, dim)==1, the following applies:
        If getMbtypeBaseDim(B8×8Idx, dim)==INTRA, the function returns–1
        Otherwise the function returns getMbtypeBaseDim (B8×8Idx, dim)/2
    Otherwise, if(I(D+d)/21==4)
        If getsubMbtypeBaseDim(B8×8Idx, dim)==INTRA, the function returns–1
        Otherwise the function returns getsubMbtypeBaseDim (B8×8Idx, dim)
Otherwise, the function returns 8.
Motion data inheritance related functions are defined hereinafter:
inheritPartitionMotion(mbLabel, mbpartIdx)
This function performs the motion data inheritance of a macroblock partition. If the corresponding base macroblocks are INTRA, no motion data inheritance is performed and the function returns 0. Otherwise motion data inheritance is performed and it returns 1.
 If (mbLabel !=8×8), the following applies.
  Let b8×8Idx be defined as follows.
   If (mbLabel==16×8) b8×8Idx=2*mbPartIdx
   Otherwise b8×8Idx=mbpartIdx
  Let mbAddrBase, mbPartIdxBase, subMbPartIdxBase be derived by invoking function getbaseIdx(b8×8Idx, 0).
  If mb_type of mbAddrBase is INTRA, the function returns 0.
  Otherwise, for X being replaced by 0 and 1, RefIdxLX [mbpartidx] and MvLX[mbpartidx][0] are set to the reference index and motion vector of mbAddrBase/mbPartIdxBase/subMbPartIdxBase.
 Otherwise,
  Let mbPartLabel be derived by applyinf sub-step 220 with mbpartIdx as input.
  If mbPartLabel is equal to INTRA, the function returns 0.
  Otherwise, the following applies.
   Let nbSubPart be the number of sub-partitions corresponding to mbPartLabel.
   Let refIdxBaseL0[i] and refIdxBaseL1[i] with i=0 . . . nbSubPart−1 be two arrays of variables.
   Let mvBaseL0[i] and mvBaseL1[i] with i=0 . . . nbSubPart-1 be two arrays of motion vectors.
   For subMbPartIdx indexed by 0 . . . nbSubPart−1, the motion inheritance is achieved as follows.
    If inheritSubPartitionMotion(mbPartLabel mbPartIdx subMbPartIdx, refIdxBaseL0, refIdxBaseL1, mvBaseL0, mvBaseL1) is equal to 0 the following applies.
     Let predIdx be a variable initialized by invoking computePredIdx(subMbPartIdx, 1).
     If inheritSubPartitionMotion(mbPartLabel, mbPartIdx, predIdx refIdxBaseL0, refIdxBaseL1, mvBaseL0, mvBaseL1) is equal to 0, the following applies.
      predIdx is derived by invoking computepredIdx (subMbPartIdx, 2).
      inheritSubPartitionMotion (mbPartLabel, mbpartIdx, predIdx, refIdxBaseL0, refIdxBaseL1, mvBaseL0 mvBaseL1) is invoked.
   For X being replaced by 0 and 1, the reference index merging is achieved as follows.
    Let minRedIdxLX be a variable set to the minimum reference index of the refIdxBaseLX[i], with i=0 . . . nbSubPart-1.
    If at least two refIdxBaseLX[i] with i=0 . . . nbSubPart'11, are different, the following applies.
     For each sub-macroblock partition, indexed by subMbPartIdx=0 . . . nbSubPart−1,
     If (refIdxBaseLX[subMbPartIdx] !=minRefIdxLX) the following applies.
      Let predIdx be computed by invoking computepredIdx(subMbPartIdx, 1).
      If (refIdxBaseLX[predIdx] !=minRefIdxLX predIdx is computed by invoking computepredIdx(subMbPartIdx, 2).
      mvBaseLX[subMbPartIdx]=mvBaseLX[predIdx]
    RefIdxLX [mbpartIdx] is set to minRedIdxLX.
    For each sub-macroblock partition, indexed by subMbPartIdx=0 . . . nbSubPart−1, the following applies MvLX[mbPartIdx][subMbPartIdx]=mvBaseLX[subMbPartIdx]
   The function returns 1.
inheritSubPartitionMotion (mbPartLabel, mbPartIdx, subMbPartIdx refIdxBaseL0, refIdxBaseL1, mvBaseL0, mvBaseL1)
This function performs the motion data inheritance of a sub-partition. If the corresponding base macroblock is INTRA, no motion data inheritance is performed and the function returns 0. Otherwise motion data inheritance is performed and it returns 1.
 Let b4×4Idx be defined as follows.
  If (mbPartLabel==8×4) b4×4Idx=2*subMbPartIdx
  Otherwise b4×4Idx=subMbPartIdx
 Let mbAddrBase, mbPartIdxBase, subMbPartIdxBase be derived by invoking function getBaseIdx(mbPartIdx, b4×4Idx)
 If mb_type of mbAddrBase is INTRA, the function returns 0.
 Otherwise, the following applies.
  For X being replaced by 0 and 1, refIdxBaseLX[subMbPartIdx] and mvBaseLX[subMbPartIdx] are set to the reference index and motion vector of mbAddrBase/mbPartIdxBase/subMbPartIdxBase.
  The function returns 1.

The invention claimed is:
1. Method as part of a process of coding or decoding video signal for deriving coding information for at least one picture part of a high resolution picture comprising high layer macroblocks from coding information of at least one picture part of a low resolution picture, each picture being divided into non-overlapping macroblocks, wherein, said coding information of the at least one picture part of the low resolution picture comprising at least partitioning information for splitting a macroblock into sub-blocks, at least one base layer macroblock of said at least one low resolution picture part is associated with each high layer macroblock of said at least one high layer picture part so that said associated base layer macroblock overlays at least partly each high layer macroblock when said at least one low resolution picture part upsampled by a first predefined ratio in a horizontal direction and a second predefined ratio in a vertical direction is superposed with said at least one high resolution picture part and wherein said method comprises the following steps:
 computing geometrical parameters for each high layer macroblock in said at least one high resolution picture part representative of a position of each high layer macroblock relatively to corresponding base layer macroblock(s) associated with each high layer macroblock; and
 deriving partitioning information for each high layer macroblock in said at least one high resolution picture part from partitioning information of the corresponding base layer macroblock(s) on the basis of said geometrical parameters wherein a high resolution picture coordinate system being associated with each high resolution picture, four geometrical parameters are computed for each high layer macroblock divided into non-overlapping blocks, in said high resolution picture coordinate system as follows:
 a first geometrical parameter is a first algebraic distance MbBorderX between a high layer macroblock center and a nearest vertical border of corresponding base layer macroblock(s), said first distance being defined according to a first direction;
 a second geometrical parameter is a second algebraic distance between the high layer macroblock center and a nearest horizontal border of corresponding base layer macroblock(s), said second distance being defined according to a second direction;
a third geometrical parameter is a third algebraic distance between the high layer macroblock center and a nearest vertical border of a block of corresponding base layer macroblock(s), said third distance being defined according to said first direction; and
a fourth geometrical parameter is a fourth algebraic distance between the high layer macroblock center and a nearest horizontal border of a block of corresponding base layer macroblock(s), said fourth distance being defined according to said second direction.

2. Method according to claim 1, wherein the step for deriving the partitioning information is preceded by a step for deriving a macroblock class for each high layer macroblock in said at least one high resolution picture part on the basis of said geometrical parameters, said macroblock class being representative of the splitting of said high layer macroblock by the borders of said corresponding base layer macroblock(s) and wherein said partitioning information is derived on the basis of said geometrical parameters and on said macroblock class.

3. Method according to claim 1, wherein said coding information of the at least one picture part of the low resolution picture further comprises sub-partitioning information and wherein said method further comprises a step for deriving sub-partitioning information for high layer macroblocks in said at least one high resolution picture part from partitioning information and sub-partitioning information of any of the corresponding base layer macroblock(s) on the basis of said geometrical parameters.

4. Method according to claim 3, wherein said coding information of the at least one picture part of the low resolution picture further comprises motion information and wherein said method further comprises a step for deriving motion information for each high layer macroblock in said at least one high resolution picture part from motion information of the corresponding base layer macroblock(s).

5. Method according to claim 4, wherein said step for deriving motion information for each high layer macroblock in said at least one high resolution picture part consists in deriving motion information for each partition of said high layer macroblock and for each sub-partition of each said partition if any.

6. Method according to claim 5, wherein said motion information of one macroblock, one partition or one sub-partition comprises at least one motion vector having a first and a second component and at least one reference index associated with said motion vector selected among a first or a second list of reference indices, said indices identifying reference pictures.

7. Method according to claim 6, wherein, the step for deriving motion information, comprises a step for homogenizing, for each high layer macroblock in said at least one high resolution picture part, motion information between sub-partitions of same partition and wherein said step consists, for each list of reference indices, in:
identifying, for each partition of said high layer macroblock, a lowest index of said sub-partitions among the reference indices of said list of reference indices;
associating said lowest reference index with each of said sub-partitions whose current reference index is not equal to said lowest reference index, said current reference index becoming a previous reference index; and
associating, with each of said sub-partition whose previous reference index is not equal to said lowest index, the a motion vector of one of its neighboring sub-partitions whose said previous reference index is equal to said lowest reference index.

8. Method according to claim 7, wherein the associated motion vector is the motion vector of the first neighboring sub-partition encountered when checking first a horizontal neighboring sub-partition, secondly a vertical neighboring sub-partition and thirdly a diagonal neighboring sub-partition.

9. Method according to any claim 7, wherein the motion vector components of motion vectors of each macroblock, partition, and sub-partition if any are scaled by the following equations:

$$\begin{cases} d_{sx} = (dx * \text{scaled\_base\_width} + \text{base\_width}/2 * \text{sign}[d_x])/\text{base\_width} \\ d_{sy} = (dy * \text{scaled\_base\_height} + \text{base\_height}/2 * \text{sign}[d_y])/\text{base\_height} \end{cases}$$

Where: $d_x$ and $d_y$ represent the coordinates of the derived motion vector;
$d_{sx}$ and $d_{sy}$ represents the coordinates of the scaled motion vector; sign is equal to 1 when x is positive and −1 when x is negative;
scaled_base_width and scaled_base_height are the width and the height of the high resolution image part respectively;
base_width and base_height are the width and height of the low resolution image part respectively.

10. Device for coding at least a sequence of high resolution pictures comprising high layer macroblocks and a sequence of low resolution pictures, each low resolution picture being divided in macroblocks comprising:
a first coding unit for coding said low resolution pictures, said first coding unit generating coding information for said low resolution pictures and a base layer data stream;
an inheritance unit for deriving coding information for at least one picture part of a high resolution picture from coding information of at least one picture part of a low resolution picture; and
a second coding unit for coding said high resolution pictures using said derived coding information, said second coding unit generating an enhancement layer data stream;
wherein, said coding information for said low resolution pictures comprising at least partitioning information for splitting a macroblock into sub-blocks, the inheritance unit comprises:
a unit for associating a base layer macroblock of said at least one low resolution picture part, with each high layer macroblock of said at least one high resolution picture part so that said associated base layer macroblock overlays at least partly each high layer macroblock when said at least one low resolution picture part upsampled by a first predefined ratio in a horizontal direction and a second predefined ratio in a vertical direction is superposed with said at least one high resolution picture part;
a unit for computing geometrical parameters for each high layer macroblock in said at least one high resolution picture part on the basis of a position of said high layer macroblock relatively to corresponding base layer macroblock(s) associated with each high layer macroblock; and
a unit for deriving partitioning information for each high layer macroblock in said at least one high resolution picture part from partitioning information of the corresponding base layer macroblock(s) on the basis of said geometrical parameters wherein a high resolution picture coordinate system being associated with each high resolution picture, said unit for computing geometrical parameters compute four geometrical parameters for each high layer macroblock divided into non-overlapping blocks, in said high resolution picture coordinate system as follows:

a first geometrical parameter is a first algebraic distance MbBorderX between a high layer macroblock center and a nearest vertical border of corresponding base layer macroblock(s), said first distance being defined according to a first direction;

a second geometrical parameter is a second algebraic distance between the high layer macroblock center and a nearest horizontal border of corresponding base layer macroblock(s), said second distance being defined according to a second direction;

a third geometrical parameter is a third algebraic distance between the high layer macroblock center and a nearest vertical border of a block of corresponding base layer macroblock(s), said third distance being defined according to said first direction; and a fourth geometrical parameter is a fourth algebraic distance between the high layer macroblock center and a nearest horizontal border of a block of corresponding base layer macroblock(s), said fourth distance being defined according to said second direction.

11. Device according to claim 10, wherein the device further comprises a module for combining said base layer data stream and said enhancement layer data stream into a single data stream.

12. Device according to claim 10, wherein said first coding unit is a MPEG-4 AVC video encoder.

13. Device for decoding at least a sequence of high resolution pictures and a sequence of low resolution pictures coded with the device according to claim 10, the coded pictures being represented by a data stream comprising:

a first decoding unit for decoding at least a first part of said data stream in order to generate low resolution pictures and coding information of said low resolution picture;

an inheritance unit for deriving coding information for at least one picture part of a high resolution picture from coding information of at least one picture part of a low resolution picture; and a second decoding unit for decoding at least a second part of said data stream using said derived coding information in order to generate high resolution pictures;

wherein, said coding information of said low resolution picture comprising at least partitioning information for splitting a macroblock into sub-blocks, the inheritance unit comprises:

a unit for associating at least one base layer macroblock of said at least one low resolution picture part with each high layer macroblock of said at least one high resolution picture part so that said associated base layer macroblock overlays at least partly said high layer macroblock when said at least one low resolution picture part upsampled by a first predefined ratio in the horizontal direction and a second predefined ratio in the vertical direction is superposed with said at least one high resolution picture part;

a unit for computing geometrical parameters for each high layer macroblock in said at least one high resolution picture part on the basis of the a position of said high layer macroblock relatively to the corresponding base layer macroblock(s) associated with said high layer macroblock; and a unit for deriving partitioning information for each high layer macroblock in said at least one high resolution picture part from the partitioning information of the corresponding base layer macroblock(s) on the basis of said geometrical parameters wherein a high resolution picture coordinate system being associated with each high resolution picture, said unit for computing geometrical parameters compute four geometrical parameters for each high layer macroblock divided into non-overlapping blocks, in said high resolution picture coordinate system as follows:

a first geometrical parameter is a first algebraic distance MbBorderX between a high layer macroblock center and the a nearest vertical border of corresponding base layer macroblock(s), said first distance being defined according to a first direction;

a second geometrical parameter is a second algebraic distance between the high layer macroblock center and a nearest horizontal border of corresponding base layer macroblock(s), said second distance being defined according to a second direction;

a third geometrical parameter is a third algebraic distance between the high layer macroblock center and a nearest vertical border of a block of corresponding base layer macroblock(s), said third distance being defined according to said first direction; and a fourth geometrical parameter is a fourth algebraic distance between the high layer macroblock center and a nearest horizontal border of a block of corresponding base layer macroblock(s), said fourth distance being defined according to said second direction.

14. Device according to claim 13, wherein the device further comprises an extracting unit for extracting said first part of said data stream and said second part of said data stream from said data stream.

15. Device according to claim 13, wherein said first decoding unit is a MPEG-4 AVC video decoder.

* * * * *